United States Patent
Peper, Jr. et al.

(10) Patent No.: US 10,630,873 B2
(45) Date of Patent: Apr. 21, 2020

(54) ANIMAL-WEARABLE FIRST PERSON VIEW SYSTEM

(71) Applicant: Command Sight, Inc., Seattle, WA (US)

(72) Inventors: Alan Robert Peper, Jr., Seattle, WA (US); Nenad Nestorovic, Seattle, WA (US)

(73) Assignee: COMMAND SIGHT, INC., Seattle, WA (US)

( * ) Notice: Subject to any disclaimer, the term of this patent is extended or adjusted under 35 U.S.C. 154(b) by 0 days.

(21) Appl. No.: 16/178,384

(22) Filed: Nov. 1, 2018

(65) Prior Publication Data

US 2019/0068850 A1 Feb. 28, 2019

Related U.S. Application Data

(63) Continuation-in-part of application No. 16/030,672, filed on Jul. 9, 2018.
(Continued)

(51) Int. Cl.
*H04N 5/225* (2006.01)
*H04N 5/232* (2006.01)
(Continued)

(52) U.S. Cl.
CPC ....... *H04N 5/2253* (2013.01); *G02B 27/0093* (2013.01); *G02B 27/0172* (2013.01);
(Continued)

(58) Field of Classification Search
CPC . H04N 5/2253; H04N 5/23206; G02B 27/176
(Continued)

(56) References Cited

U.S. PATENT DOCUMENTS 3,373,444 A * 3/1968 Militello ............... A42B 3/185
2/10
5,732,415 A 3/1998 Boyd
(Continued)

FOREIGN PATENT DOCUMENTS

DE 102014001041 A1 7/2015
WO 2016025443 A1 2/2016

OTHER PUBLICATIONS

International Search Report and Written Opinion dated Oct. 2, 2018 for PCT Application No. PCT/US18/42889 of Command Sight, Inc.
(Continued)

*Primary Examiner* — Prabodh M Dharia
(74) *Attorney, Agent, or Firm* — Perkins Coie LLP

(57) ABSTRACT

An animal-wearable head-mountable display (AW-HMD) device comprises a head fitting designed to fit the head of an animal, and an output subsystem coupled to or integral with the head fitting and configured to output a signal to the animal. The device can comprise an optical module configured to project images into an eye of the animal, and various other modules, such as an audio module, a tactile module and/or an olfactory module. An animal-wearable first person view (AW-FPV) system may be used separately or in conjunction with the AW-HMD device, to enable a remote human user to view the animal's real-world environment from the animal's point of view.

23 Claims, 21 Drawing Sheets

Related U.S. Application Data

(60) Provisional application No. 62/537,883, filed on Jul. 27, 2017, provisional application No. 62/581,501, filed on Nov. 3, 2017.

(51) Int. Cl.
*G02B 27/01* (2006.01)
*H04N 7/18* (2006.01)
*G02B 27/00* (2006.01)

(52) U.S. Cl.
CPC ....... *G02B 27/0176* (2013.01); *H04N 5/2256* (2013.01); *H04N 5/232* (2013.01); *H04N 5/23206* (2013.01); *H04N 7/18* (2013.01); *G02B 2027/0138* (2013.01); *H04N 7/185* (2013.01)

(58) Field of Classification Search
USPC .................................. 345/8, 419; 703/1; 2/10
See application file for complete search history.

(56) References Cited

U.S. PATENT DOCUMENTS

| | | | |
|---|---|---|---|
| 7,372,370 | B2 | 5/2008 | Stults et al. |
| 9,516,862 | B1 | 12/2016 | Emilo |
| 10,094,855 | B1 | 10/2018 | Fuhr et al. |
| 10,521,940 | B2 | 12/2019 | Cricri et al. |
| 2004/0130681 | A1 | 7/2004 | Aastuen et al. |
| 2005/0151924 | A1 | 7/2005 | Di et al. |
| 2007/0217586 | A1* | 9/2007 | Marti .............. H04M 1/642 379/201.01 |
| 2008/0141681 | A1 | 6/2008 | Arnold |
| 2008/0169923 | A1* | 7/2008 | Belden .................... A47F 7/024 340/568.3 |
| 2008/0243385 | A1 | 10/2008 | Yamamoto et al. |
| 2009/0171233 | A1 | 7/2009 | Lanfermann et al. |
| 2012/0206335 | A1 | 8/2012 | Osterhout et al. |
| 2013/0103360 | A1* | 4/2013 | Hsu ..................... G06T 19/20 703/1 |
| 2014/0247951 | A1 | 9/2014 | Malaviya |
| 2014/0304891 | A1 | 10/2014 | Waters |
| 2014/0313225 | A1 | 10/2014 | Lee et al. |
| 2015/0054716 | A1 | 2/2015 | Hirabayashi et al. |
| 2015/0279022 | A1 | 10/2015 | Shuster et al. |
| 2015/0351896 | A1* | 12/2015 | D'Lima ................. A61F 2/062 604/522 |
| 2016/0047746 | A1* | 2/2016 | Tokhtuev ............. G01N 21/645 250/459.1 |
| 2016/0063767 | A1* | 3/2016 | Lee ....................... G06T 19/006 345/419 |
| 2016/0097721 | A1* | 4/2016 | Bolduc ................ G01N 21/645 |
| 2017/0072316 | A1* | 3/2017 | Finfter .................. A63F 13/428 |
| 2017/0092235 | A1 | 3/2017 | Osman et al. |
| 2017/0108697 | A1 | 4/2017 | El-Ghoroury et al. |
| 2017/0135315 | A1 | 5/2017 | Marmen et al. |
| 2017/0153672 | A1* | 6/2017 | Shin .................... G02B 27/0176 |
| 2018/0092601 | A1* | 4/2018 | Wagner .............. A61B 5/14552 |
| 2018/0181196 | A1* | 6/2018 | Lee .................... H04N 5/23296 |
| 2018/0253856 | A1* | 9/2018 | Price ..................... G01S 17/023 |
| 2019/0068850 | A1 | 2/2019 | Peper et al. |
| 2019/0320244 | A1* | 10/2019 | Albers .................. G01N 29/50 |

OTHER PUBLICATIONS

K-9 Storm Intruder, Real-Time Encrypted Camera; retrieved online on Jun. 21, 2018 from url:http://www.k9storm.com/intruder; 3 pages.

K9 Vision System; retrieved online on Jun. 21, 2018 from url: https://prok9supplies.com/k9-vision-system-for-sale.html; 10 pages.

WolfPAK K9 ISR—Advanced Canine (K9) Camera System; MissionTEQ; retrieved online on Jun. 21, 2018 from url: https://missionteq.com/canine-camera-system; 7 pages.

K9 Vision System, Full Version; retrieved online on Oct. 23, 2018 from url: https://prok9supplies.com/k9-vision-system-k9-vision-system-full-version-kvfv4.html, 4 pages.

K9 HELM head protection for working dogs; Trident K9 Tactical Helmet; retrieved online on Oct. 23, 2018 from url: www.k9helm.com/trident-helmet, 2018, 3 pages.

Williams, Fiona, et al., "Development of a Head-mounted, Eye-tracking System for Dogs", Journal of Neuroscience, vol. 194, Issue 2; retrieved online from url: http://eprints.lincoln.ad.uk/3673/1/Development_of_a_head-mounted%2C_eye-tracking_system_for_dogs.pdf, Jan. 15, 2011, pp. 259-265.

Int'l Search Report and Written Opinion dated Jan. 18, 2019 for PCT Application No. PCT/US18/58917 of Command Sight, Inc., filed on Nov. 2, 2018, 12 pages.

Non-Final Office Action dated Jul. 19, 2019 for U.S. Appl. No. 16/030,672 of Peper, Jr. et al., filed Jul. 9, 2018.

Applicant-Initiated Interview Summary dated Dec. 9, 2019 for U.S. Appl. No. 16/030,672 of Peper, Jr. et al., filed Jul. 9, 2018.

Notice of Allowance dated Feb. 4, 2020 for U.S. Appl. No. 16/030,672 of Peper, Jr. et al., filed Jul. 3, 2018.

\* cited by examiner

ANIMAL-WEARABLE FIRST PERSON VIEW SYSTEM

This application is a continuation-in-part of U.S. patent application Ser. No. 16/030,672, filed on Jul. 9, 2018, which claims the benefit U.S. provisional patent application No. 62/537,883, filed on Jul. 27, 2017, each of which is incorporated by reference herein in its entirety. This application further claims the benefit of U.S. provisional patent application No. 62/581,501, filed on Nov. 3, 2017, which is incorporated by reference herein in its entirety.

FIELD

At least one embodiment of the present disclosure pertains to head-mountable display and viewing devices, and more particularly, to a head-mountable display device designed to be worn by an animal and having a first person viewing system.

BACKGROUND

Head mountable display (HMD) devices are available on the market today, but they are designed only for use by humans. Thus, their current form factors, optical arrays and software are not suitable for use with animals. Additionally, certain camera products are available that can be put on an animal and used to acquire images approximately from the animal's perspective, such as GoPro cameras, which can be put on a dog's back. However, these products are also generally intended for human use and are not optimal for use with animals, due to problems with image stability and other factors.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
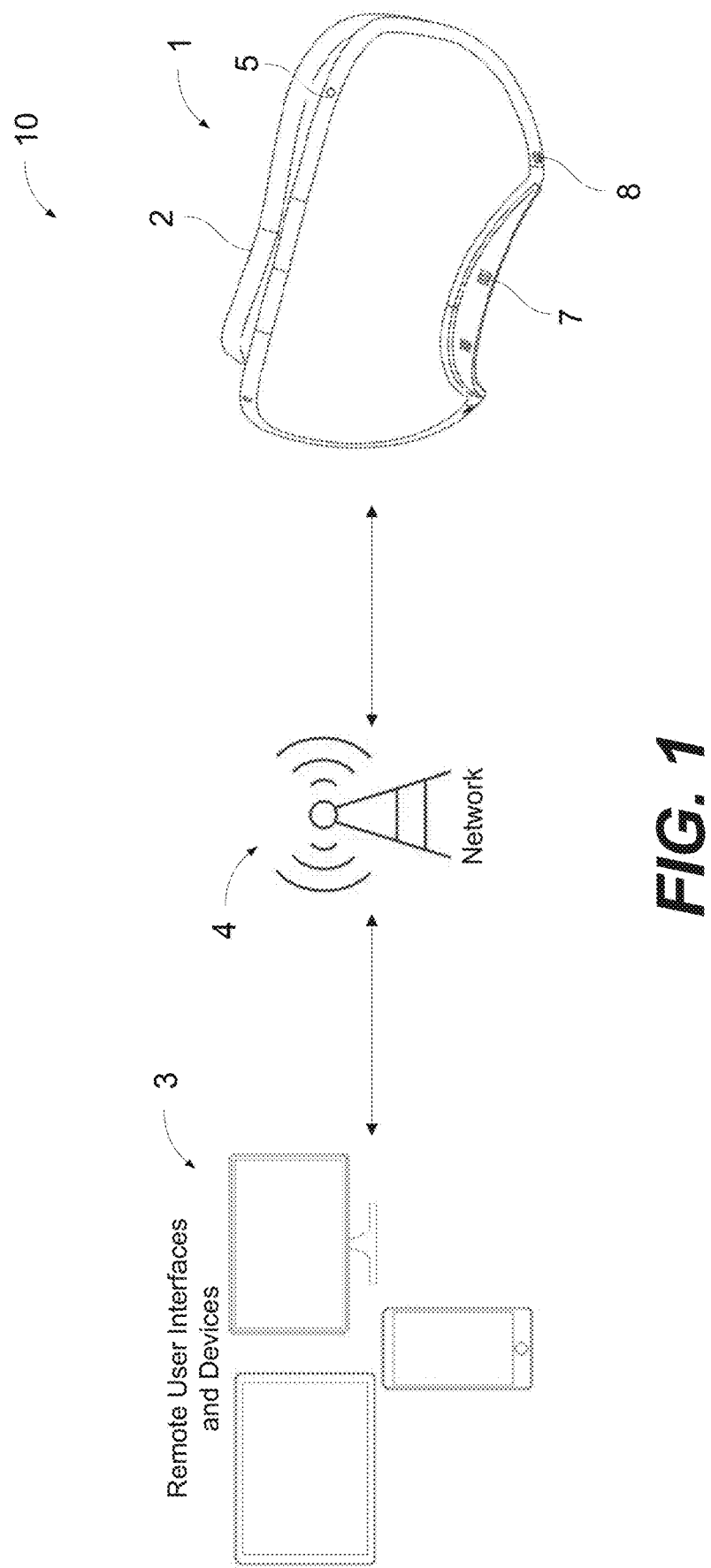
FIG. 1 illustrates an overview of an Animal Wearable Head Mountable Display (AW-HMD) system.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced herein are a device and system for communication between an animal and a human, that enables direct, specific communication of instructions to the animal, such as regarding desired direction and/or desire of the human. Note that the term "animal" as used herein is intended to exclude humans. The system can include an Animal Wearable Head Mountable Display (AW-HMD) device that provides visual cues directly to an animal at the direction of the handler, who may be located remotely from the animal (i.e., not within the animal's normal range of hearing or vision). The system also or alternatively include an Animal Wearable First Person View (AW-FPV) system that enables direct viewing by a human of the animal's visual perspective. Further, the system may provide nonvisual signals to the animal, such as tactile (e.g., haptic), auditory or olfactory signals, or any combination thereof, which may be based on remote user inputs from the human.

I. Animal Wearable Head-Mounted Display System

At least some of the embodiments of the AW-HMD device introduced here comprise a headset portion that includes a head fitting in the form of a ruggedized goggle designed to accommodate the distinct form factor of an animal's head (generally though not necessarily designed to optimally fit a particular animal species), a light source, a lens array, camera optics, and controls and feedback mechanisms for auditory, olfactory and/or tactile data. The AW-HMD enables viewing by a human of an animal's direct line of sight and visual communication of images back into the line of sight of the animal. The device can be used to provide signals to the animal so that there is no ambiguity in direction, target, or any other visual reference point. The AW-HMD device can include non-visual sensors, multiple cameras and integrated optical equipment and associative computing and processing power. These components may include optics equipment (e.g., display, one or more lenses, beamsplitter) to display visual content to the animal, an outward facing camera to capture the animal's line of sight, and an inward facing camera to address alignment between the animal's eye and optics and/or to perform eye tracking. Additional sensory and spectral detection sensors can also be included, along with custom-designed software to address issues related to mammal-specific visual acuity and/or other species-specific visual acuity.

The AW-HMD device disclosed herein is designed for animals, with at least some contemplated embodiments being particularly designed for mammals, and more particularly, for canines. However, the principles introduced here can additionally or alternatively be applied and/or adapted for use with other species, including non-mammalian species. At least some embodiments of the system introduced here have the following capabilities: (1) permit delivery of information into the line of sight and/or perception of the animal without discernment of such information by third parties; (2) provide direct line of sight ("first-person" viewing) of what the animal sees (here the term "person" in "first-person" does not refer to a human); (3) integrate olfactory responses into the design; (4) adjust for varied lighting scenarios; (5) automatically calibrate to the eye position of the animal; (6) integrate haptic controls for additional communications; and (7) integrate audio controls for bi-directional audio communication.

At least some embodiments of the AW-HMD system may also have one or more of the following: a near field-light source, an optical array, a flexible near-to-eye display (NED), an infrared camera and imaging to detect heat sources, optical arrays for use in veterinary/clinical practices to test animal visual acuity and perception, spectral sensors to detect external anomalies, audio components, pupil tracking, and/or haptics.

FIG. 1 shows an overview of the AW-HMD system. The AW-HMD system 10 in the illustrated embodiment includes an AW-HMD device 1 that includes a headset portion comprising goggles 2 to be worn on the head of the animal, such that the goggles 2 cover one or both eyes of the animal. The AW-HMD device 1 can perceive the outside world and is aware of objects and conditions in the environment through sensors such as range finders, IR sensors, camera(s), or the like. The AW-HMD device 1 may communicate through a networked connection 4 (e.g., via one or more wired and/or wireless networks) with remote user interfaces and device 3. The remote user interfaces and device 3 may provide a user interface to allow a human user to control functions of the AW-HMD device 1 through a networked connection 4. Through the networked connection 4 and an audio module 5 in the AW-HMD device 1, a user can use the remote user interfaces and device 3 to communicate bi-directionally with the AW-HMD device 1 and to communicate with the animal.

The AW-HMD device 1 may have any of various different form factors to fit any of various different functional and anthropomorphic requirements. In some embodiments, the AW-HMD device 1 may be designed with conventional goggles 2, as noted above. The goggles 2 may at least partially enclose active computer graphics displays, which may be configured as see-through (at least partially transparent) displays, such that digital imagery and objects can be overlaid on the animal's view of its environment. Any of various see-through display technologies and optical designs may be used, such as emissive displays (e.g., light emitting diode (LED), organic LED (OLED), or active-matrix OLED (AMOLED)), holographic displays, or the like. The optical configuration may include a single reflexive display, monocular display, or binocular display.

The AW-HMD device 1 may also have a number of integrated computing elements, which may include one or more integrated microprocessors and/or digital signal processors (DSPs), power management, as well as wired and wireless communications transceivers (e.g., for universal serial bus (USB), cellular, WiFi, Bluetooth, mesh connections, etc.). The AW-HMD device 1 may also have one or more positional sensors, such as global positioning system (GPS) circuitry, accelerometers, inertial measurement unit (IMU), or the like. It may also have other sensors, such as a camera(s), rangefinders, microphones, speakers, hyperspectral camera, spectral illuminators, temperature sensors, olfactory detection, Geiger counter, and the like.

Some embodiments of the AW-HMD device 1 may include eye-tracking sensors to determine and assist in the alignment of the optical display(s) to the animal's eye(s). Data gathered by eye-tracking sensors may also be made available through a networked connection 4 to remote user interfaces and devices 3, such that the external interfaces and devices 3 can be alerted to changes in the eye-box relative to the animal's active field of view (FOV). Additionally, embodiments of the AW-HMD device 1 may also optimize the delivery of imagery to the animal through the display such that colors are optimized for the animal or animal species (e.g., dichromacy for canines) as well as for optimal contrast. Additionally, the AW-HMD device 1 may generate images and objects for display to the animal by using shapes optimized for the visual perception capabilities of a particular animal or animal species, which shapes may include linear, oblong, elliptical, orbicular, lanceolate, ovate, oblanceolate, obvate, triangular and deltate shape types.

The AW-HMD device 1 may also have integrated command and control features, which may include contextually based control, active control, user control, remote control, passive control, or the like. For example, the AW-HMD device 1 may have an integrated sensor, such as a camera and associated detection circuitry that can perform object recognition (e.g., facial, landmark, or the like) on captured images, such that the integrated processing system can interpret an object and relay an indication of the identified object to the remote user interfaces and device 3 through a networked connection 4. The AW-HMD device 1 may also provide various types of signals to the animal directly (automatically and/or based on user inputs) through the optical display.

The AW-HMD device 1 may also adjust itself based on measured or perceived environmental conditions, such as ambient light. For example, in dark environments the AW-HMD device 1 may decrease the level of contrast of a digitally displayed object or image. In some embodiments, the control technology may be mounted on the AW-HMD device 1 such that a user can make manual adjustments directly to the AW-HMD device 1. Alternatively or additionally, some embodiments may include the ability to make adjustments to the contrast of displayed objects through an remote user interface and device 3 through a networked connection 4.

Additionally, some embodiments of the AW-HMD device 1 may include active sensory feedback. For example, embodiments of the AW-HMD device 1 may have integrated olfactory delivery capability, such that a user connected through a networked remote user interface 3 may trigger delivery of olfactory cues through an olfaction sensor and delivery component 7 on the AW-HMD device 1, to provide signals to the animal. Some embodiments of AW-HMD device 1 may also include haptic feedback elements 8 to provide signals to the animal. For example, a user, through a network connection 4 and an remote user interface or device 3, may input into the remote user interface 3 to activate the haptic feedback elements 8 on AW-HMD device 1.

Some embodiments of the AW-HMD device 1 may have sensors that detect movement of the animal (e.g., pace change, position, and the like) including accelerometers, gyros, and other internal measurements, where the integrated processors may interpret the tracked movement and provide quantitative and qualitative measurements of the animal's position and/or motion to the remote user interfaces and device 3.

As noted above, the AW-HMD device 1 may be in communication with remote user interfaces 3. The remote user interfaces 3 may be generated by devices having any of various different forms. For example, a cell phone screen may be adapted to receive input from AW-HMD device 1 and may be set up to actively control functional aspects of the AW-HMD device 1. The remote user interface 3 may additionally or alternatively include other forms, such as one or more tablets, laptop computers, desktop computers, or the like. In each case, the remote user interface may also include sensors (e.g., IMU, accelerometers, compass, temperature, and the like) to provide additional input in controlling the AW-HMD device 1 and instructing the animal.

Figure 2A:
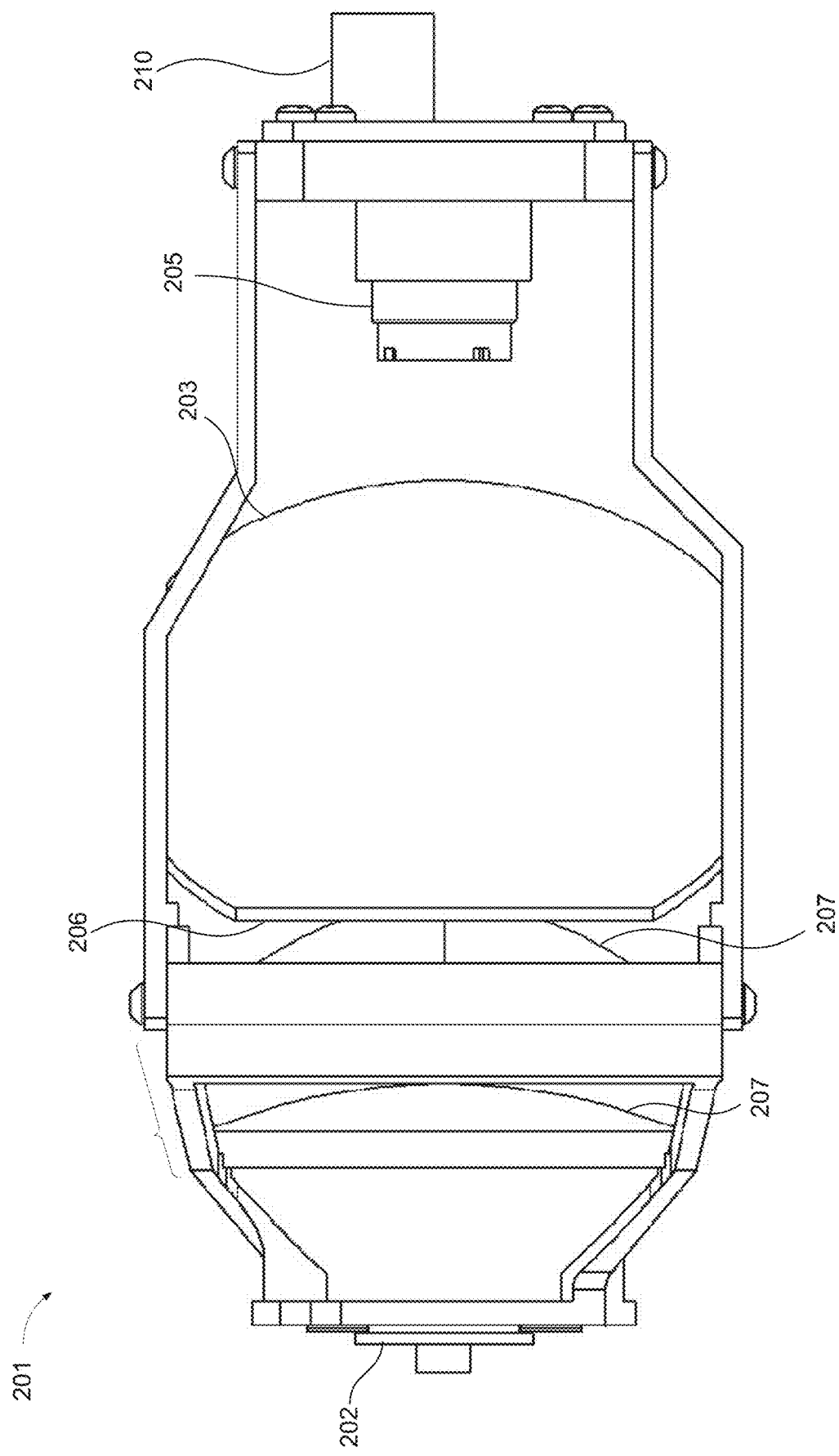
FIG. 2A is an example of a side cross-sectional view of a side-mounted optical module that can be used for this purpose in the AW-HMD device.

As mentioned above, the AW-HMD device 1 may include one or more optical modules to display images to the animal. FIG. 2A is an example of a side cross-sectional view of a side-mounted optical module that can be used for this purpose in the AW-HMD device 1. The view in FIG. 2A is from the perspective of the animal when the AW-HMD device 1 is being worn by the animal. The illustrated optical module 201 includes a computer-operated display 202 (such as, for example, an eMagin SXGA096-CFXL OLED display), a beamsplitter/combiner 203 with reflective coatings, a lens array 204 that includes a plurality of lenses and/or waveguides 207, and camera 205. Note that while the illustrated embodiments shows two lenses 207, other embodiments may have a different number of lenses, which could be just a single lens. The display 202 emits substantially uniform light that is generally directed towards the reflective beamsplitter/combiner 203, through the lens array 204. The camera 205 is aligned with the display 202 in the direction in which most light is emitted from the display 202.

A portion of the light that is emitted by the display 202 is reflected by the reflective beamsplitter/combiner 203 (perpendicularly to the plane of the drawing) into the eye of the animal (not shown). Another portion of that emitted light is passed through the beamsplitter/combiner 203 and captured by the camera 205, such that any images produced by the display 202 can be monitored and tracked in three-dimensional space by remote user interfaces and devices 3. Additionally, a portion of the light that impinges on the beamsplitter/combiner 203 from the animal's environment is reflected by the beamsplitter/combiner 203 to the camera 205, which provides images of the animal's optical perspective for transmission to remote user interfaces and devices 3.

Figure 4A:
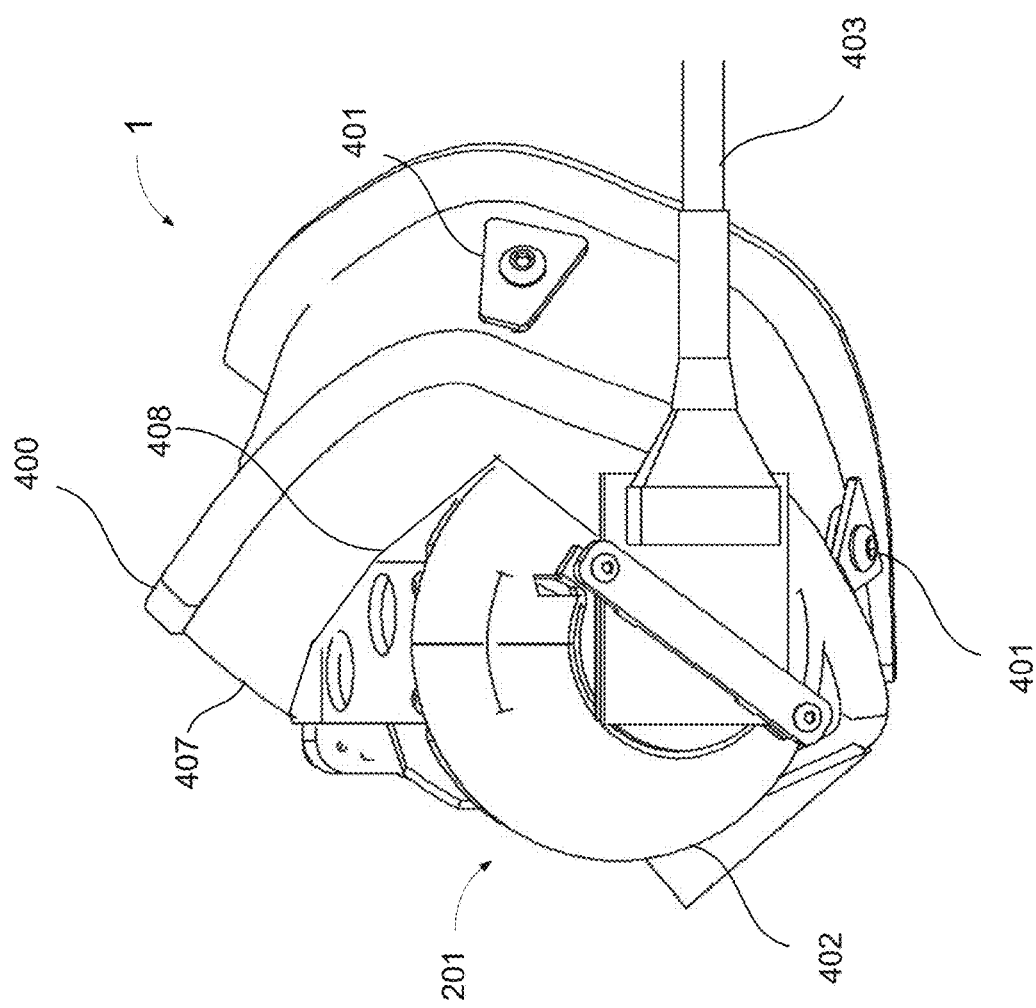
FIG. 4A shows a side view of an embodiment in which the optical module is integrated with goggles.
Figure 4B:
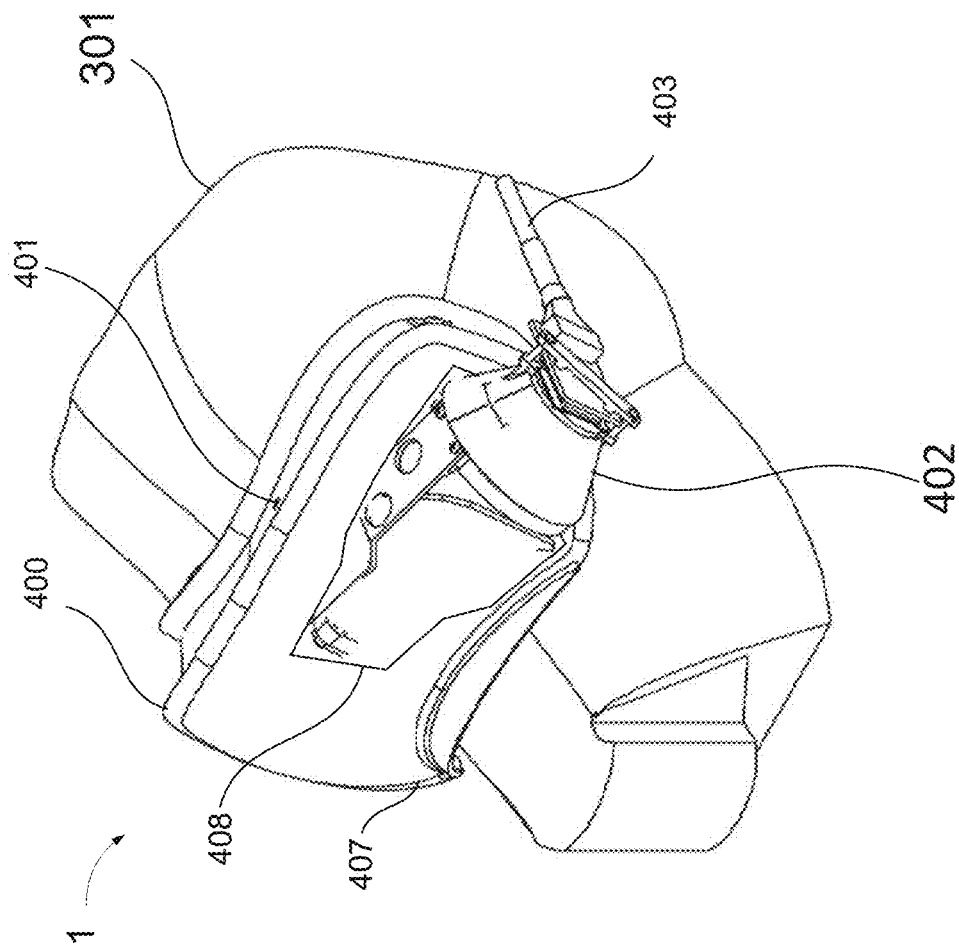
FIG. 4B shows a front/side perspective view of an embodiment in which the optical module is integrated with goggles.
Figure 4C:
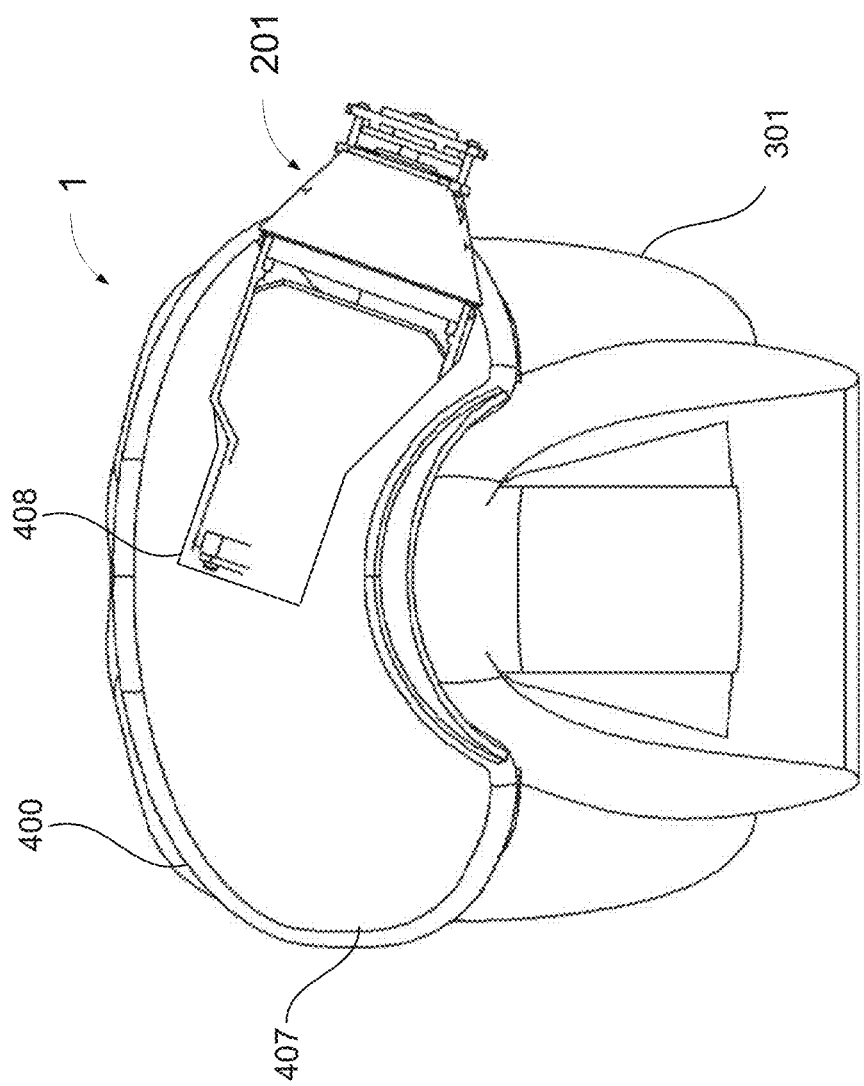
FIG. 4C shows a front view of an embodiment in which the optical module is integrated with goggles.

The optical module 201 can be lightweight and compact such that it fits into a small portion of an AW-HMD device 1. This allows integration of the optical module 201 into off-the-shelf canine goggles, such as canine goggles made by Rex Specs. An example of the manner of integration is illustrated in FIGS. 4A 4B and 4C, discussed further below. Note that other embodiments of the optical module 201 may instead have top-mounted or bottom-mounted configurations, with correspondingly modified configurations of the lens array 204 and beamsplitter/combiner 203.

Figure 2B:
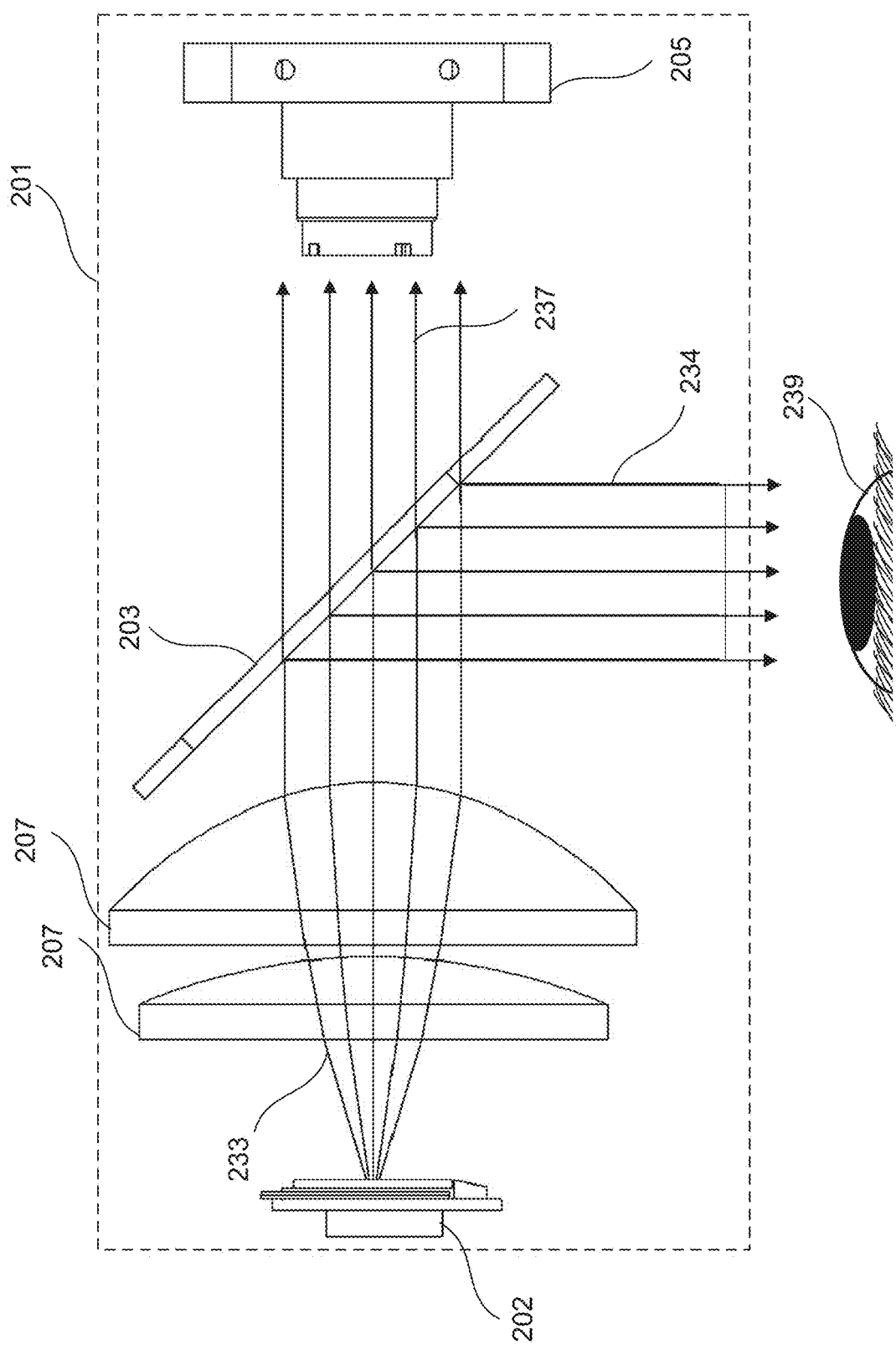
FIG. 2B schematically illustrates the operation of the optical module of FIG. 2A.

The manner of operation of the optical module of the AW-HMD 1 is further explained now with reference to FIG. 2B. Note that the illustrated features are not necessarily drawn to scale. In FIG. 2B, optical module 201 is viewed from a position either directly above or directly below the animal's head.

As mentioned above, in at least some embodiments displays digital image content to an eye 239 of an animal wearing the AW-HMD 1 and allows the animal to see through the display, such that the digital content is perceived by the animal as augmenting the animal's view of the surrounding environment, i.e., as augmented reality (AR) and/or mixed reality (MR) images. The optical configuration may have a variably transmissive optical element that is in-line with the animal's view of its surroundings, such that the degree of transmission of the see-through view can be increased and decreased. The variably transmissive optical element may be or include, for example, the beamsplitter/combiner 203 and/or one or more of the lenses 207. This feature may be helpful in situations where the animal would be better served with a high degree of transmission of see-through view and when, in the same AW-HMD device 1, the animal would be better served with a lower degree of transmission of see-through transmission. The lower degree of see-through transmission may be used, for example, in bright conditions and/or in conditions where higher contrast for the digitally presented objects are desirable.

The camera captures images (video and/or stills) of the surrounding environment by receiving reflected light from the surrounding environment off of the beamsplitter/combiner 203, which is in-line with the animal's see-through view of the surrounding. In some embodiments, the light emission surface of the display element 202 is enclosed by a light shield 402 (FIG. 4B), such that ambient light does not interfere with light reflected 237 and/or transmitted 233 in the direction of the camera 1101, which is captured by the camera 1101 to enable a remote user to view an image of where the object being displayed is being shown to the animal in three-dimensional space.

In some embodiments, as shown, the camera 205 aperture is perpendicular to the direction in which the animal is looking and directly aligned with the display element 202, as shown in FIGS. 2A and 2B. Image light 233 is emitted by the display element 202, and a portion 234 of that image light 233 is reflected toward the animal's eye 239 by the inward facing surface of the partially reflective beamsplitter/combiner 203. Most of the remaining portion 237 of the image light 233 from the display element 202 simply passes through the beamsplitter/combiner 203 to the camera 205 to capture the animal's view of the computer-generated images. Additionally, a portion of the light received from the animal's surrounding environment (not shown) is reflected off the outward facing surface of the beamsplitter/combiner 203 and into the camera 205, to capture the animal's view of its environment, while another portion of that light energy from the environment is passed through the beamsplitter/combiner 203 to the animal's eye 239.

In some embodiments, the beamsplitter/combiner 203 includes a coating on its surface that faces the camera 205, such that visible wavelength light is substantially transmitted while infrared light is substantially reflected; and the camera 205 captures images that include at least a portion of the infrared wavelength light. In such embodiments, the image light 233 includes visible wavelength light, and portion 237 of the visible wavelength light is transmitted by the beamsplitter/combiner 203. This may be useful to remote users through a networked connection 4 on remote interfaces and devices 3 to view the image presented by AW-HMD device 1 to the animal when in low-light conditions, for example.

As noted, the optical module 201 may contain a lens 207 or an array 204 of lenses 207, where light from the display element 202 is projected through the lens or lens array 204 onto the beamsplitter/combiner 203 to overlay objects onto the animal's view of the real world. Light control structures (not shown) can also be included to control the distribution of the light that is delivered by the display element 202. The light control structures can include, for example, diffusers, elliptical diffusers, prism films and lenticular lens arrays, prism arrays, cylindrical lenses, Fresnel lenses, refractive lenses, diffractive lenses or other structures that control the angular distribution of the image light 233.

Additionally, the optical module 201 is not limited to a side-mounted display nor to a monocular display. Other embodiments, for example, can be in a binocular display, whereby images and objects are displayed to both eyes simultaneously. Additionally, other embodiments may include a single, flexible reflexive surface, where images and objects are displayed directly onto that reflexive surface.

Figure 3A:
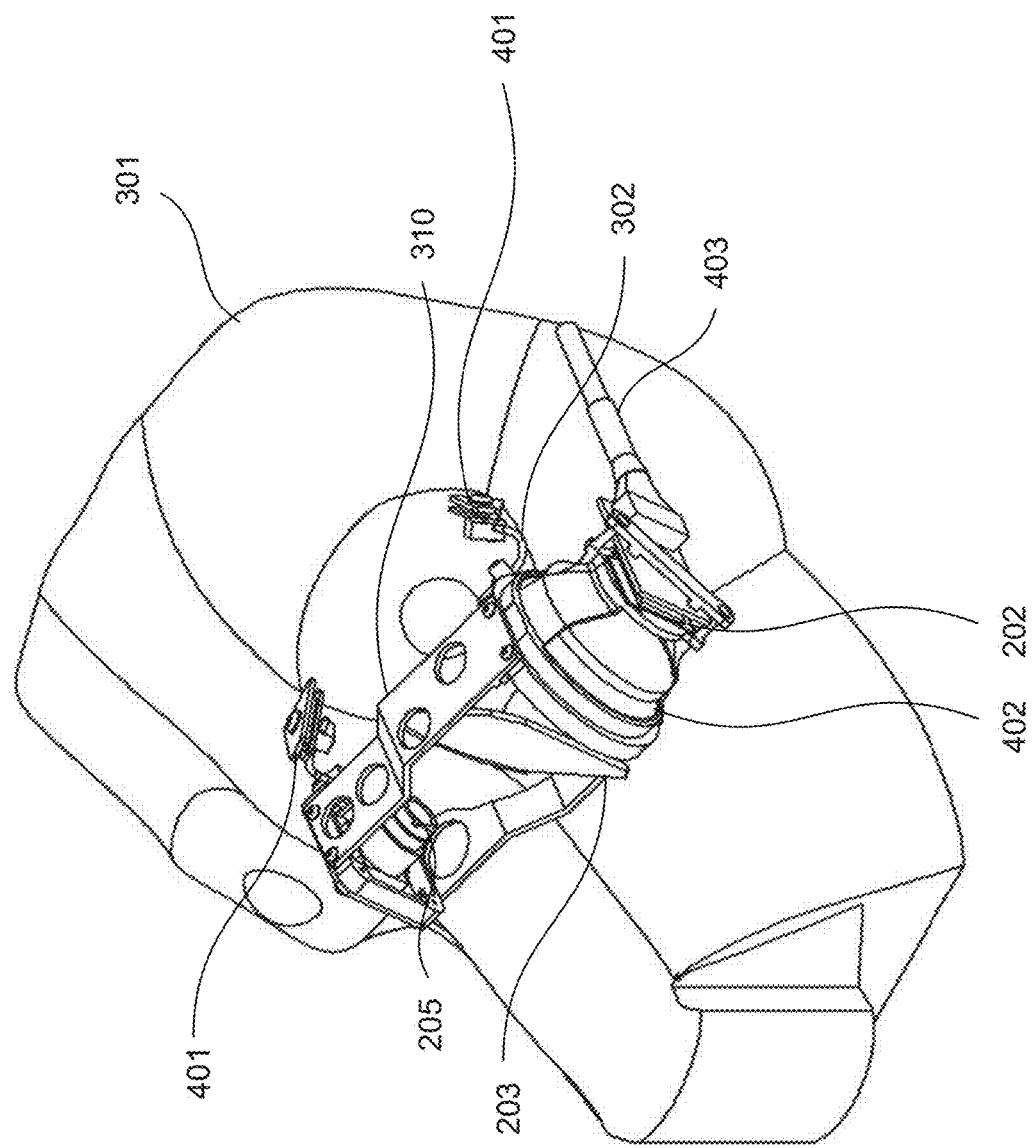
FIG. 3A shows a front/side perspective view of an embodiment of the AW-HMD device mounted on the head of an animal.
Figure 3B:
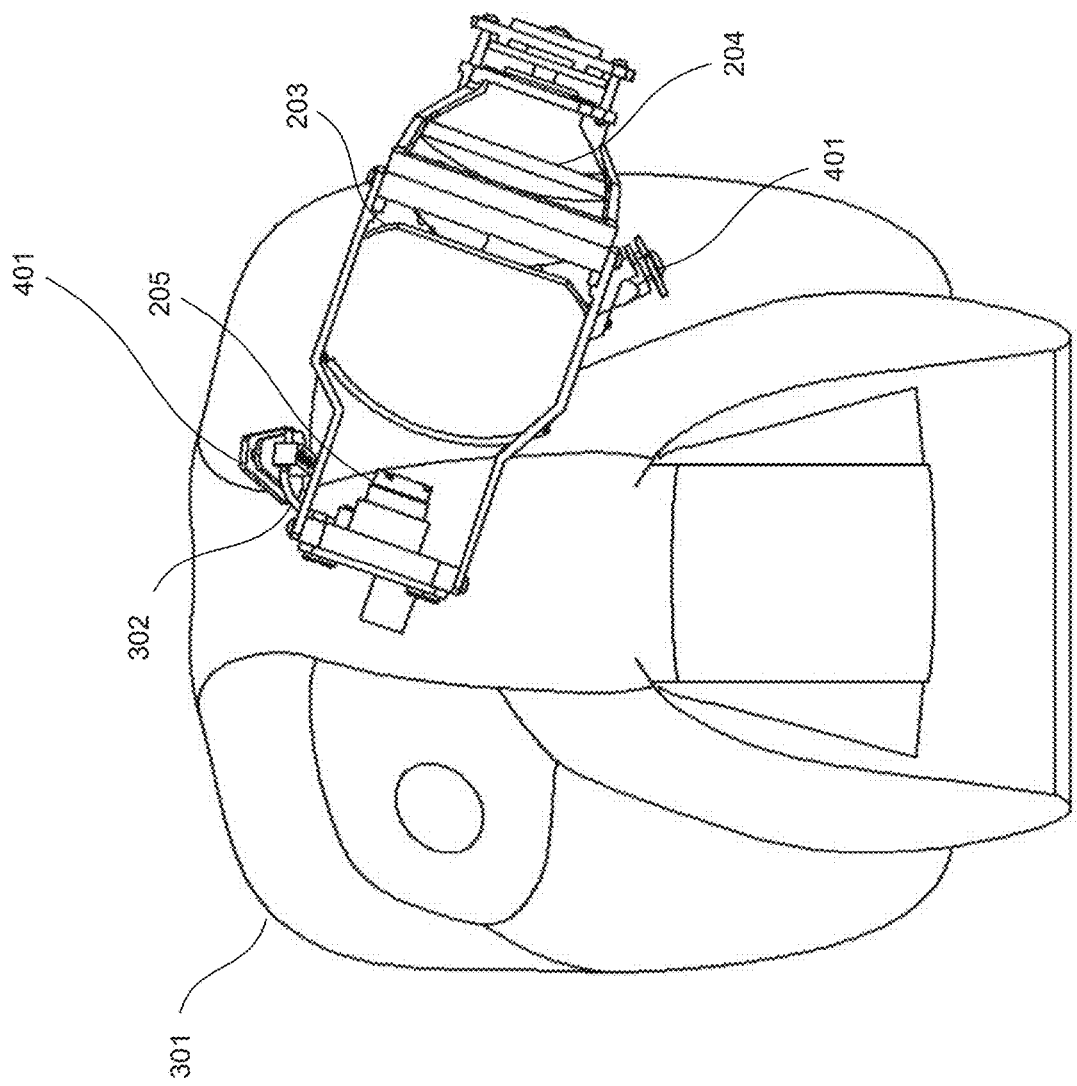
FIG. 3B shows a front view of the embodiment of AW-HMD device shown in FIG. 3A.

An embodiment of the optical system discussed with regard to FIGS. 2A and 2B can be seen in FIGS. 3A and 3B, showing an example of how the optical module 201 may be worn on the head 301 of a canine. The actual mounting mechanism, including goggles, is not shown in FIGS. 3A and 3B for clarity, but is shown in FIGS. 4A, 4B and 4C. The display element 202, beamsplitter/combiner 203, lens array 204 and camera 205 are coupled together by a pair of brackets 310. The lens array 204 (not visible in FIGS. 3A and 3B) may be covered by a light shield 402 to reduce interference from ambient light. A flexible cord 403 is used to provide power from a separate power supply (not shown) to the AW-HMD device 1 and to bi-directionally communicate data and control signals between the AW-HMD device 1 and a microprocessor and/or wireless transceiver (not shown). As discussed below, the power supply, microprocessor, memory and wireless transceiver may be mounted on or in a vest worn by the animal.

FIGS. 4A, 4B and 4C show three different views illustrating how the optical module 201 can be integrated with off-the-shelf canine goggles 400, such as those made by Rex Specs. Specifically, FIG. 4A shows a left-side view, FIG. 4B shows a top/left-side view, and FIG. 4C depicts a front view of such an embodiment. A region 408 can be cut out of the lens 407 of the goggles 400, through which the optical module 201 can be inserted and suspended so that the optical module 201 partially protrudes from the goggles 400, as shown. As shown, three mounts 401 can be used to secure the optical module 201 to the frame of the goggles 401 and suspend the optical module 201 in place. As shown, the mounts 401, which may include screws or other suitable fasteners, may be placed above the goggles lens, below the goggles lens, and to the side of the optical array 201, for example. Each of the mounts 401 attaches to one of the brackets 310 within the interior space of the goggles 400. Moreover, some embodiments may include adjustable mounting arms 302, such that appropriate adjustments can be made to align the optical module to the animal's eye. Moreover, to integrate the optical array 201 into the pre-existing goggles 400, modification to the front lens of the pre-existing goggles can be done, such that the optical array 201 partially protrudes outside of the finished goggle 400, while at the same time minimizing the opening.

Figure 4D:
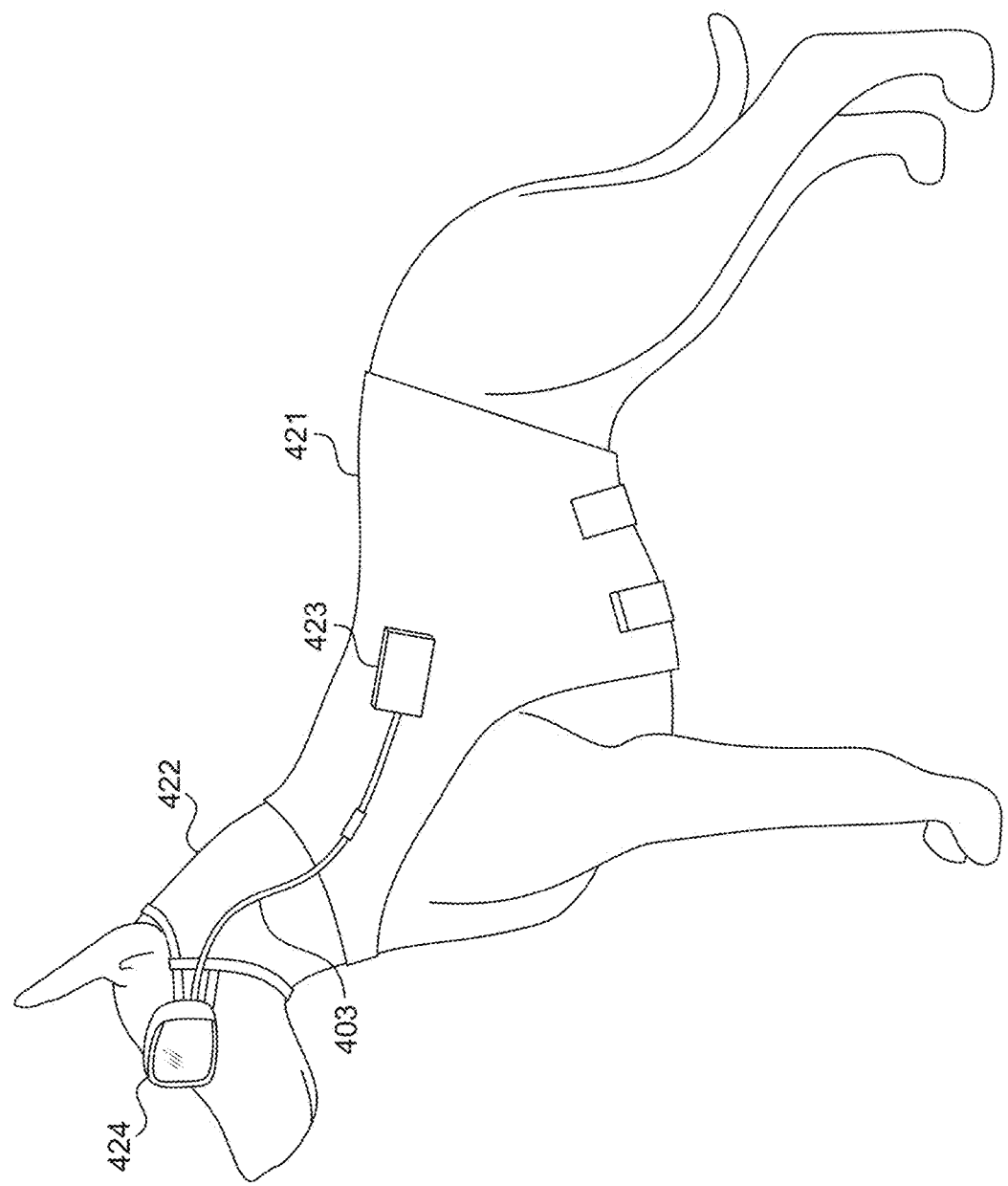
FIG. 4D shows an animal wearing the AW-HMD device, including headset and vest portions.

As shown in FIG. 4D, some of the components of the system may be mounted on or in a vest 421 worn by the animal 422, such as the power supply (e.g., battery), microprocessor, memory and wireless transceiver. These components may be contained within one or more physical modules 423 that are attached to the vest and connected to the headset portion 424 of the AW-HMD 1 by one or more cables 403 for providing power to the headset portion 424 and communicating data between the headset portion 424 and the components in the module(s) 423. In other embodiments, the one or more modules may communicate with and/or provide power to the headset portion 424 wirelessly.

Another consideration relating to integration of an optical module into an animal-worn form factor is the departure from traditional design principles that are based on a more-planar human face, to a design suitable for an animal with a less-planar face, such as a dog or other animal with a prominent snout. To account for these variants, the location of the optical array may need to be adjusted so that it can clear, in this present example, the snout of a canine. To enable this adjustment and to account for potential variants of an animal's facial features while also allowing for the best "eye-box" to be presented to the animal, in certain embodiments the mechanism used to mount the optical array 201 to the goggles 400 can allow for rotational adjustment of the optical array 201 relative to the goggles 400. With this rotation of the optical module 201, it is possible to adjust its positioning for protruding features, such as the animal's snout. To further account for such facial variations, a small portion 206 of the beamsplitter/combiner 203 can be cut off near an edge, as shown in FIG. 2A, such that an optical fit can be made, while maintaining the largest possible eye-box for the animal.

Figure 5:
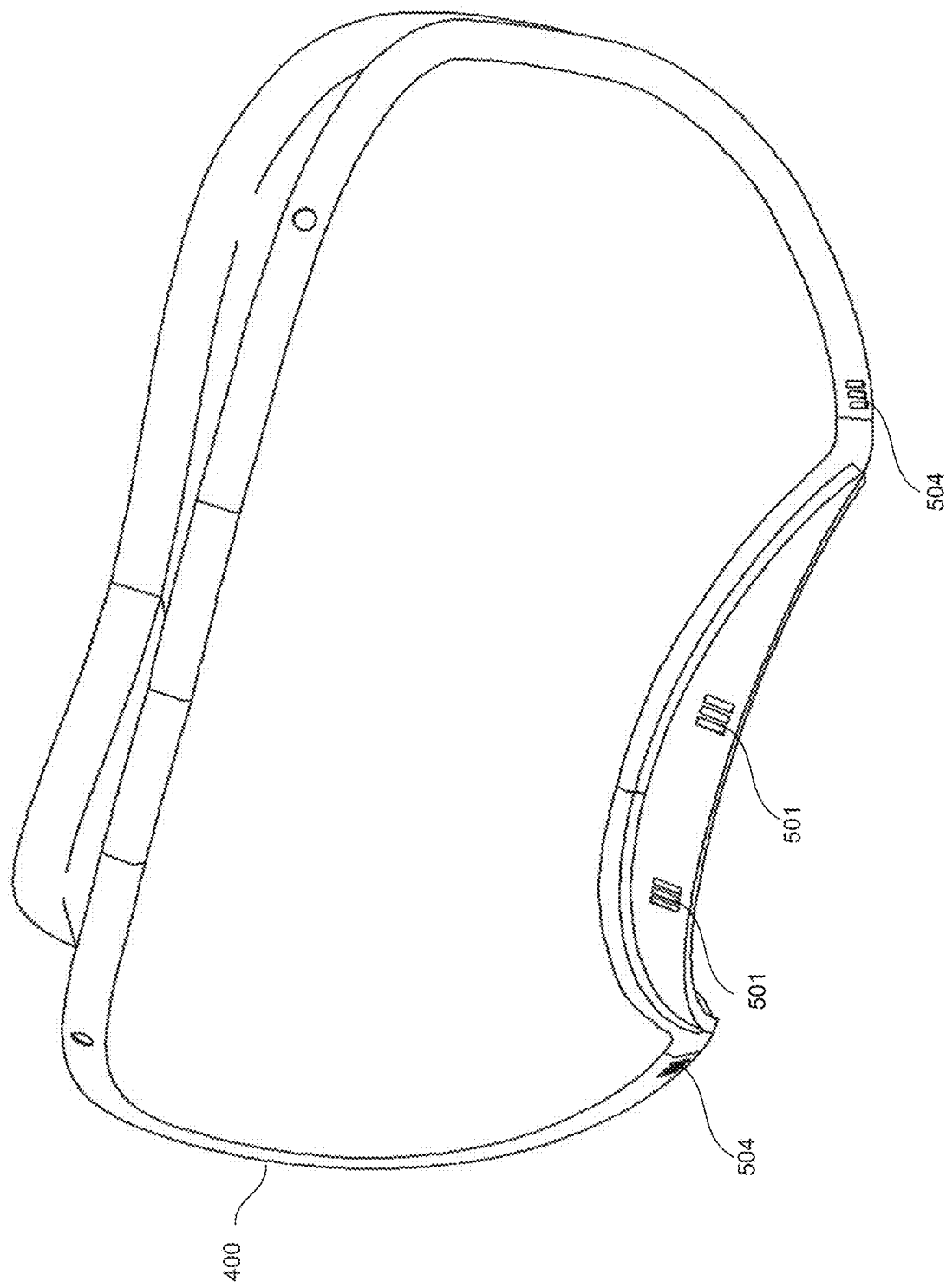
FIG. 5 shows an embodiment of AW-HMD device 1 with olfactory and tactile enhancement and detection capability.

FIG. 5 shows an embodiment of AW-HMD device 1 with olfactory enhancement and detection capability (to facilitate illustration, the optical module is not shown in this view, but would be present in an actual device). The olfactory sense and response elements 501 enable a remote human user to deliver olfactory cues to the animal and to receive olfactory or olfactory-based cues from the AW-HMD device 1, each via a network connection 4 and remote user interfaces and devices 3. Elements 501 have a wired or wireless (e.g., Bluetooth) connection (not shown) with a microprocessor and/or long-range wireless transceiver (not shown) on the AW-HMD device 1. These elements enable a human handler to detect scents, passively, or actively, in the environment by allowing air to naturally be inducted or through vacuuming air into the scent discrimination system in the AW-HMD device 1. Additionally or alternatively, the olfaction system may deliver scent cues to the animal to direct the animal or otherwise elicit a scent-based response. In some instances the AW-HMD device 1 and its associative computing elements may be able to deliver scent cues to the animal automatically (i.e., not in response to a direct human input), having previously been programmed by a remote user with the appropriate scent detection profile and response.

FIG. 5 also shows an embodiment of the AW-HMD device 1 with tactile (e.g., haptic) sensing and feedback capability. The haptic sensors/feedback elements 504 may enable a remote user through a networked connection 4 on an remote user interface or device 3 to deliver haptic feedback to the animal, e.g., to control the animal's direction of movement or gaze. Additionally, through the use of associative computing power, accelerometers and like in the AW-HMD device 1, the AW-HMD device 1 may also be able to deliver haptic feedback to a remote user through a networked connection 4, based on predetermined inertial measurements that may be recorded via the AW-HMD device 1. Haptic feedback, for the AW-HMD device 1 or remote user may include the application of force, vibrations and/or other subtle movements. Elements 504 can be assumed to have a wired or wireless connection with an on-board microprocessor and/or wireless transceiver on the AW-HMD device 1.

Figure 6:
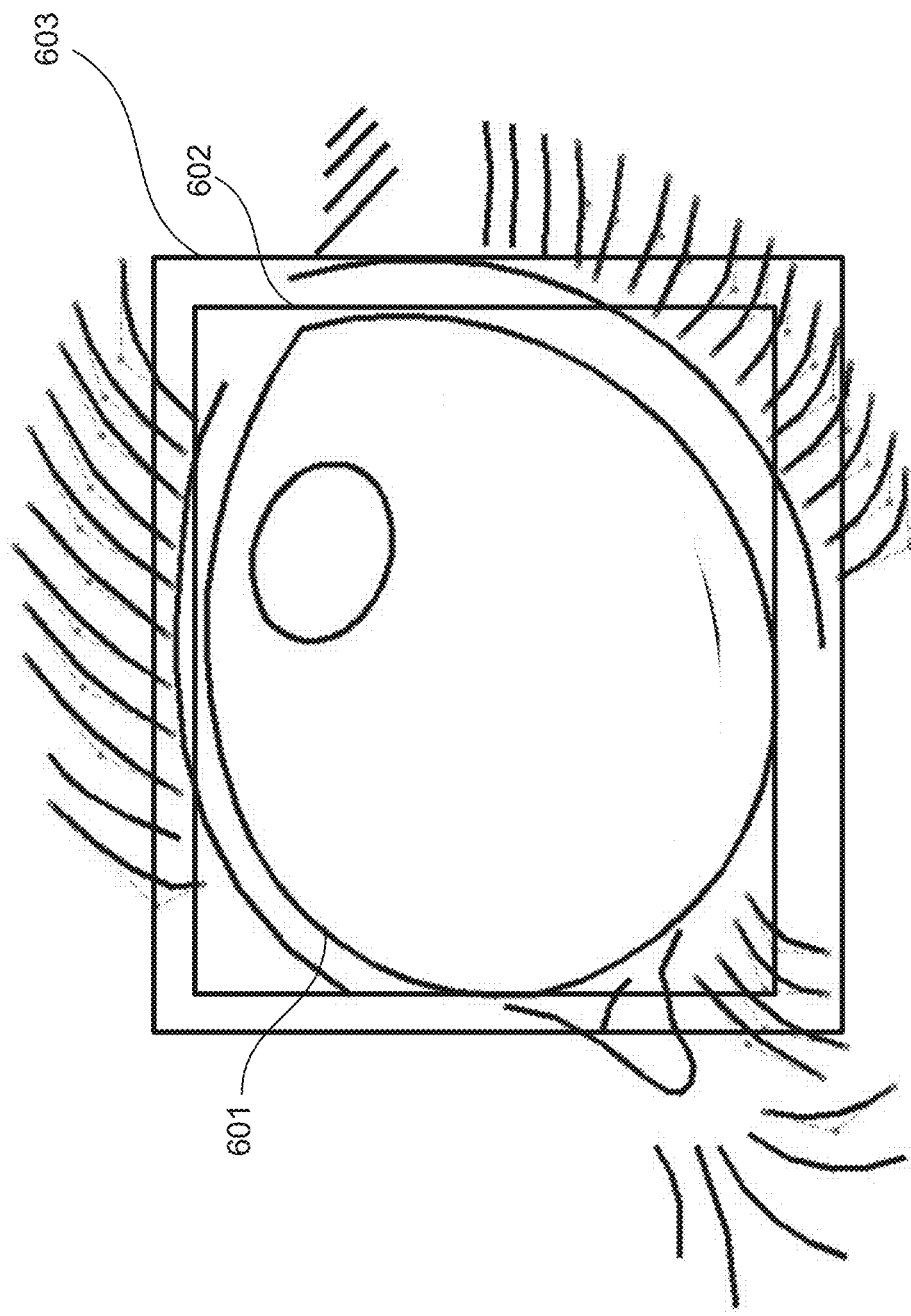
FIG. 6 shows a canine eye to illustrate certain principles of eye-tracking.

FIG. 6 shows a canine eye to illustrate how eye-tracking can be done in accordance with the technology introduced here. An embodiment of the AW-HMD device 1 with eye-tracking capability may incorporate at least two cameras, including an eye camera to capture an image of the animal's eye and a second camera to capture images of the animal's environment. The figure depicts the pupil of the eye 601 with a pupil tracking area 602, and a spot search area 603 for tracking the relation of the pupil within the eye-box, such that if the pupil 601 changes in relation to the eye-box, the corresponding FOV may be relayed to remote user interfaces and devices 3.

Figure 7:
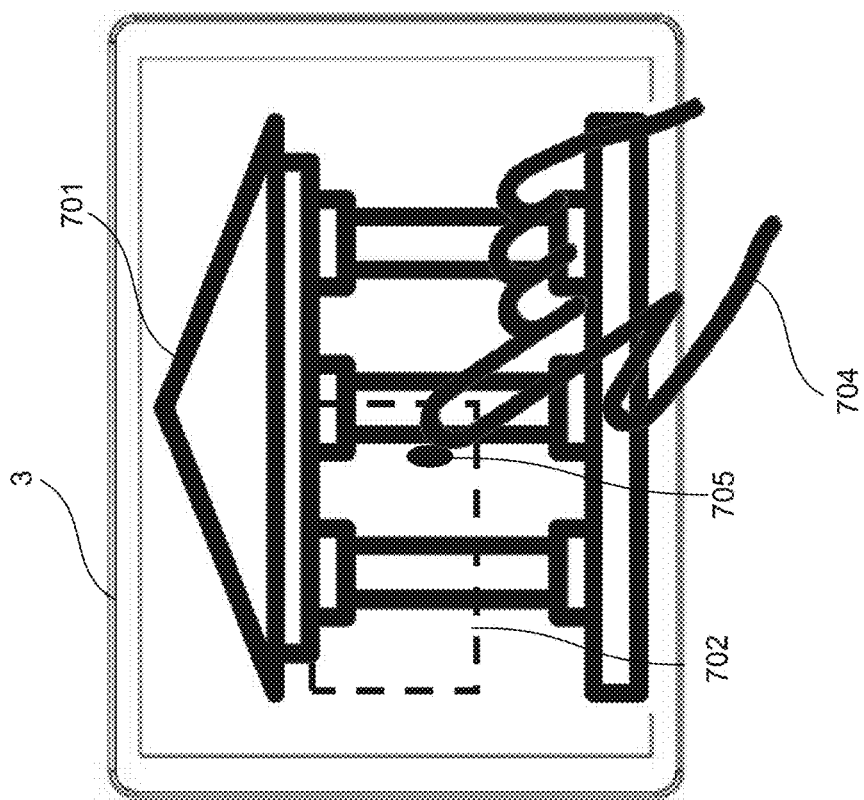
FIG. 7 depicts an example of a scenario that may be encountered during use of the AW-HMD device.
Figure 7:
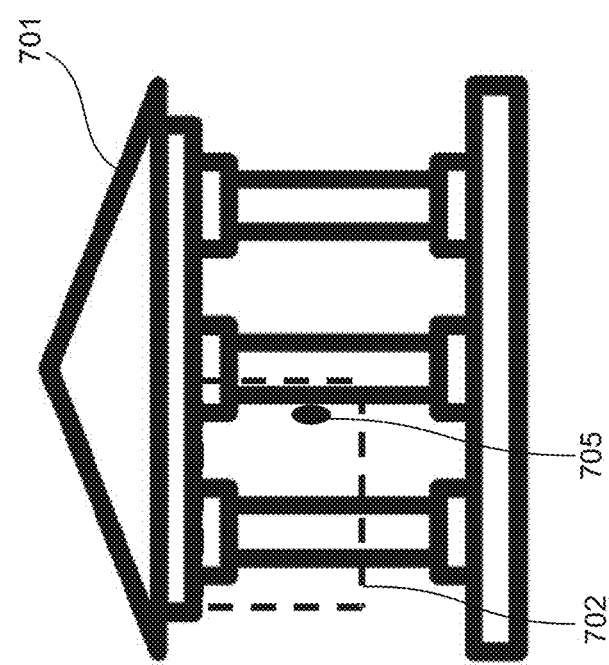

FIG. 7 depicts a scenario that may be encountered during use of the AW-HMD device 1. In this embodiment, the animal wearing the AW-HMD device 1 is viewing a building 701. The FOV of the animal that can be addressed by the AW-HMD device 1, in particular by the optical module 201, is represented by dotted box 702. Through a remote user interface and device 3, a remote user 704 can view (via a networked connection 4) the FOV addressable by the optical module 201, as represented by the dotted box 702. In addition, through the camera sensor on AW-HMD device 1, the remote user 704 may also view beyond the optical module and the animal's immediate FOV. Additionally, the remote user 704 may input into the optical module 201 (e.g., through speech or some physical action on the remote user interface and device 3) to highlight areas in the addressable FOV 702 of the optic that can be perceived by the animal, which in this instance is shown as a dot 705.

Moreover, the AW-HMD device 1 is not limited to being able to highlight objects in the physical world that are in the immediate and direct FOV of the optical module 201. The technology introduced here can also enable a remote user to tag or otherwise direct their input to subject matter outside of the animal's current FOV through the optical module 201 but within the FOV of a camera of the AW-HMD device 1. For example, the remote user can "tag" an area or object within the addressable FOV of the camera on the user interface 3 but outside the animal's FOV through the optical module 201, which may cause the AW-HMD device 1 to direct the animal (e.g., through visual, haptic or audible signal) to adjust its head position, to bring the tagged area/object within the animal's FOV through the optical module 201.

Figure 8:
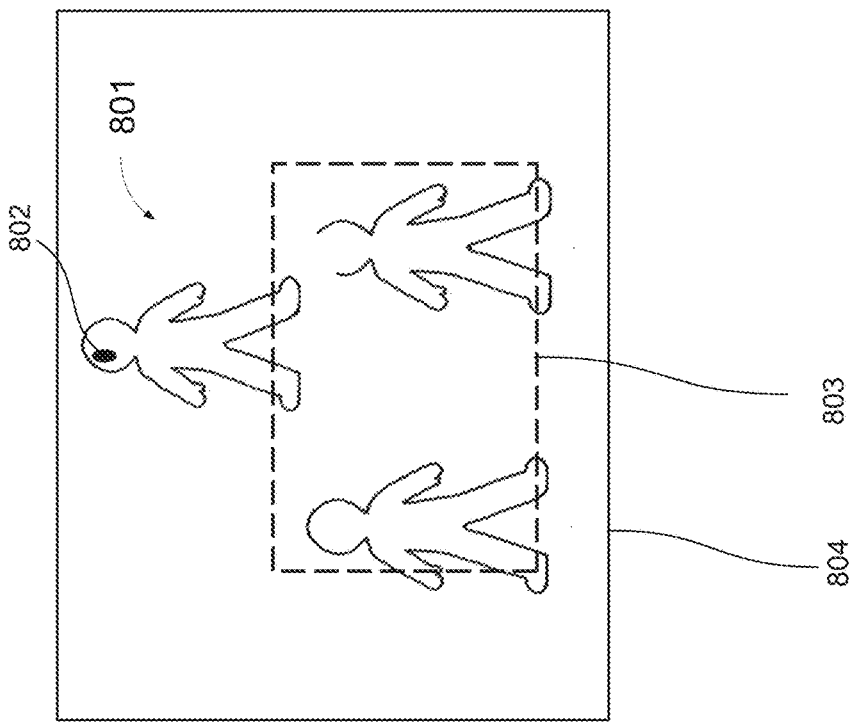
FIG. 8 depicts another example of a scenario that may be encountered during use of the AW-HMD device.
Figure 8:
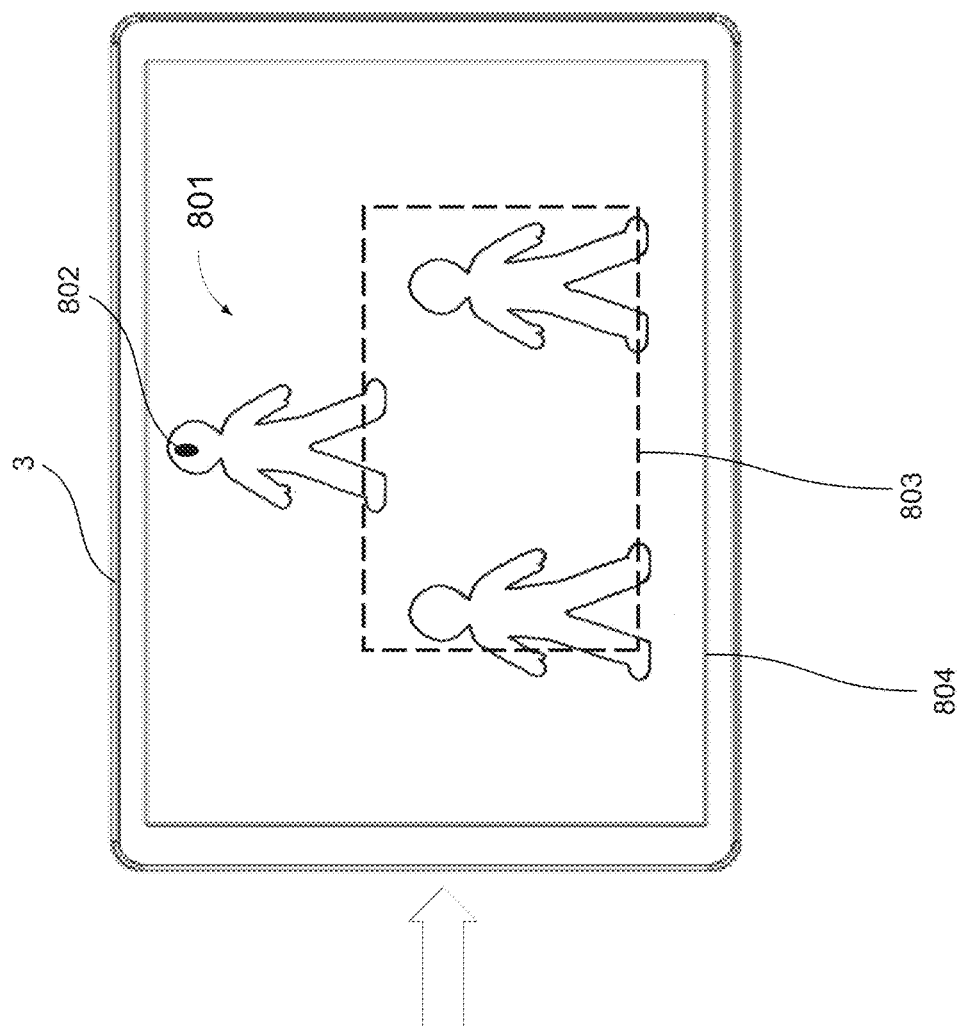

FIG. 8 depicts another use scenario, in which the animal wearing the AW-HMD device 1 encounters a group of people 901, and the AW-HMD device 1, through object and facial recognition, overlays a cue (e.g., a dot) 802 on a user-designated object (e.g., a specific person), even though the object is not within the FOV 803 of the optical module 201. This may occur when the camera in the AW-HMD device 1, having a larger FOV 804 than the FOV 803 of the optical module 201, detects a desirable object and tags the object such that the optical module 201 can activate as soon as the object is in the animal's FOV. An example in which this may be desirable is where a law enforcement unit sends a dog wearing the AW-HMD device 1 into a hostile environment for surveillance. In this case, the law enforcement officers may be unaware of hostiles in the area being surveilled. However, because of the AW-HMD device 1 and its associative computing capabilities, if the dog were to come into contact with a hostile group and a member of that group were to be identified as a "wanted" target, the system may automatically select that "wanted" individual as the desired target to apprehend, as shown by the cue 802. By doing so, the AW-HMD device 1 may allow for trained animals to have higher mission capabilities, since they are no longer as reliant on the human handler for cues. Additionally, embodiments may also allow a remote user to view the objects being tagged through a networked connection 4, as shown.

Figure 9:
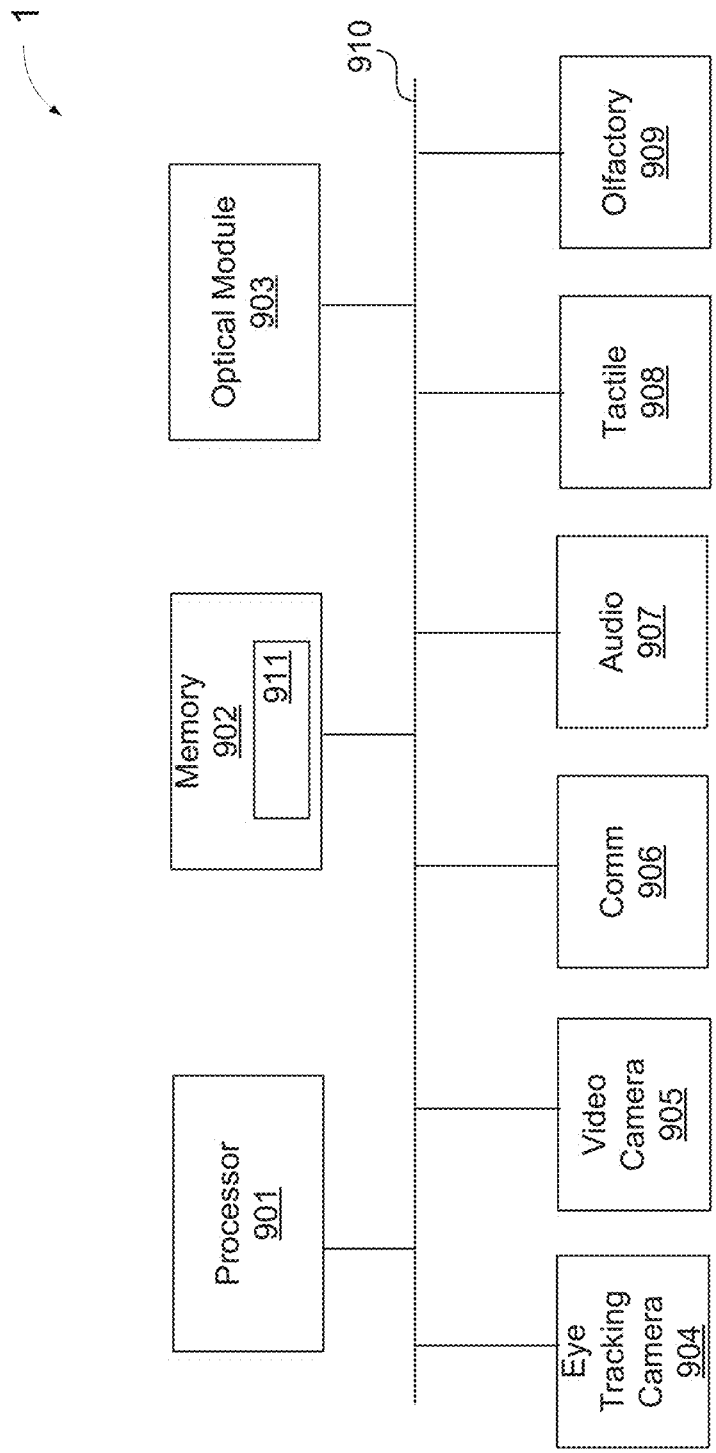
FIG. 9 is a block diagram of the major components of the AW-HMD device according to at least one embodiment.

FIG. 9 is a high-level block diagram showing the major components of the AW-HMD device 1 according to at least one embodiment. Note that other embodiments of the AW-HMD device 1 may not include all of the components shown in FIG. 9, and/or may include additional components not shown in FIG. 9.

In the illustrated embodiment, the physical components of the AW-HMD device 1 include one or more of each of: a processor 901, a memory 902, an optical module 903, an eye-tracking video camera 904, a video camera 905 for imaging the animal's environment in the animal's line of sight, a communication subsystem 906, an audio subsystem 907, a tactile subsystem 908, and an olfactory subsystem 909, all coupled together (directly or indirectly) by an interconnect 910. Note that in some embodiments, one or more of these components may be located off the headset portion of the AW-HMD device 1, such as on a vest worn by the animal, as shown and described with reference to FIG. 4D.

The interconnect 910 may be or include one or more conductive traces, buses, point-to-point connections, controllers, adapters, wireless links and/or other conventional connection devices and/or media, at least some of which may operate independently of each other.

The processor(s) 901 individually and/or collectively control the overall operation of the AW-HMD device 1 and perform various data processing and control functions. For example, the processor(s) 901 may provide at least some of the computation and data processing functionality for generating and displaying computer-generated images to the animal and/or for providing other signals to the animal (e.g., auditory, olfactory or haptic). Each processor 901 can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Data and instructions (code) 911 that configure the processor(s) 901 to execute aspects of the mixed-reality visualization technique introduced here can be stored in the one or more memories 902. Each memory 902 can be or include one or more physical storage devices, which may be in the form of random access memory (RAM), read-only memory (ROM) (which may be erasable and programmable), flash memory, miniature hard disk drive, or other suitable type of storage device, or a combination of such devices.

The optical module 903 may include one or more active display elements (e.g., an OLED display) and associated optics, for displaying computer-generated images to the animal. The communication subsystem 906 enables the AW-HMD device 1 to receive data and/or commands from, and send data and/or commands to, a remote processing system, such as remote user interfaces and devices 3. The communication subsystem 906 can be or include one or more of, for example, a Wi-Fi transceiver, cellular transceiver (e.g., LTE/4G or 5G), Bluetooth or Bluetooth Low Energy (BLE) transceiver, baseband processor, a universal serial bus (USB) adapter, Ethernet adapter, cable modem, DSL modem, or the like, or a combination thereof.

The audio subsystem 907 can be or include one or more speakers and/or one or more microphones. The tactile subsystem 908 may be or include one or more haptic actuators to provide haptic signals to the animal, and/or one or more haptic sensors by which to provide haptic feedback to a remote human user. The olfactory subsystem 909 may be or include one or more olfactory delivery elements to provide olfactory signals to the animal, and/or one or more olfactory sensors by which to provide olfactory feedback to a remote human user.

II. Animal-Wearable First Person View System

As noted above, some embodiments of the technology introduced here enable direct viewing by a human of the animal's visual perspective ("first person view"). Thus, embodiments disclosed herein include an Animal-Wearable First Person View (AW-FPV) digital capture and communications system that enables direct observation of an animal's direct line of sight, visual communication back to the animal, as well as bidirectional audio communication between the device and a remote human handler. Such embodiments may include: 1) a video camera system for the direct observation by a human of an animal's visual perspective that can be attached to existing animal worn hardware, objects, devices, and the like, 2) a video and auditory communications system for the direct observation by a human of an animal's visual perspective, and bidirectional audio feedback that can be attached to existing animal worn hardware, objects, devices, and the like, and 3) a video system for the direct observation by a human of an animal's visual perspective, and projecting light emitting sources for visual communication back to the animals that can be attached to existing animal worn hardware, objects, devices, and the like.

The AW-FPV system described herein may be integrated with an AW-HMD such as described above. Alternatively, the AW-FPV system may be a separate device that can be used alone or in conjunction with an AW-HMD system, such as AW-HMD system 1 described above.

Some embodiments of the AW-FPV system include the following components: a ruggedized housing with simple screw mount designed to mount flush with animal worn goggles, and one or more cameras integrated into the housing and capable of capturing the visual perspective of the animal. The AW-FPV system (also called "AW-FPV device" herein) may further include one or more microprocessors, controllers, wireless transceivers, or the like, and memory to store software and data. The AW-FPV system may also have one or more of the following: speaker; microphone; infrared camera; visible-light and/or infrared light sources, thermal camera; accelerometer; and/or magnetometer; gimbal; fold mirror(s); visible light sources. A microphone or microphones may be used to provide ambient or active auditory signals to a remote human handler. A speaker or speakers enable auditory commands from a remote human handler (or a computer system) to be given to the animal or to other persons or animals in the vicinity of the device. An outward facing light emitting source enables display of visual cues back into the line of sight of the animal. Further, additional sensors may also accompany the system along with custom software to specifically address issues related to mammal specific or species specific visual perception, morphology, physiology and the like. Other features of the AW-FPV system may include digital and/or mechanical image stabilization to account for the particular morphology and movement patterns of mammals or specific species.

Figure 10:
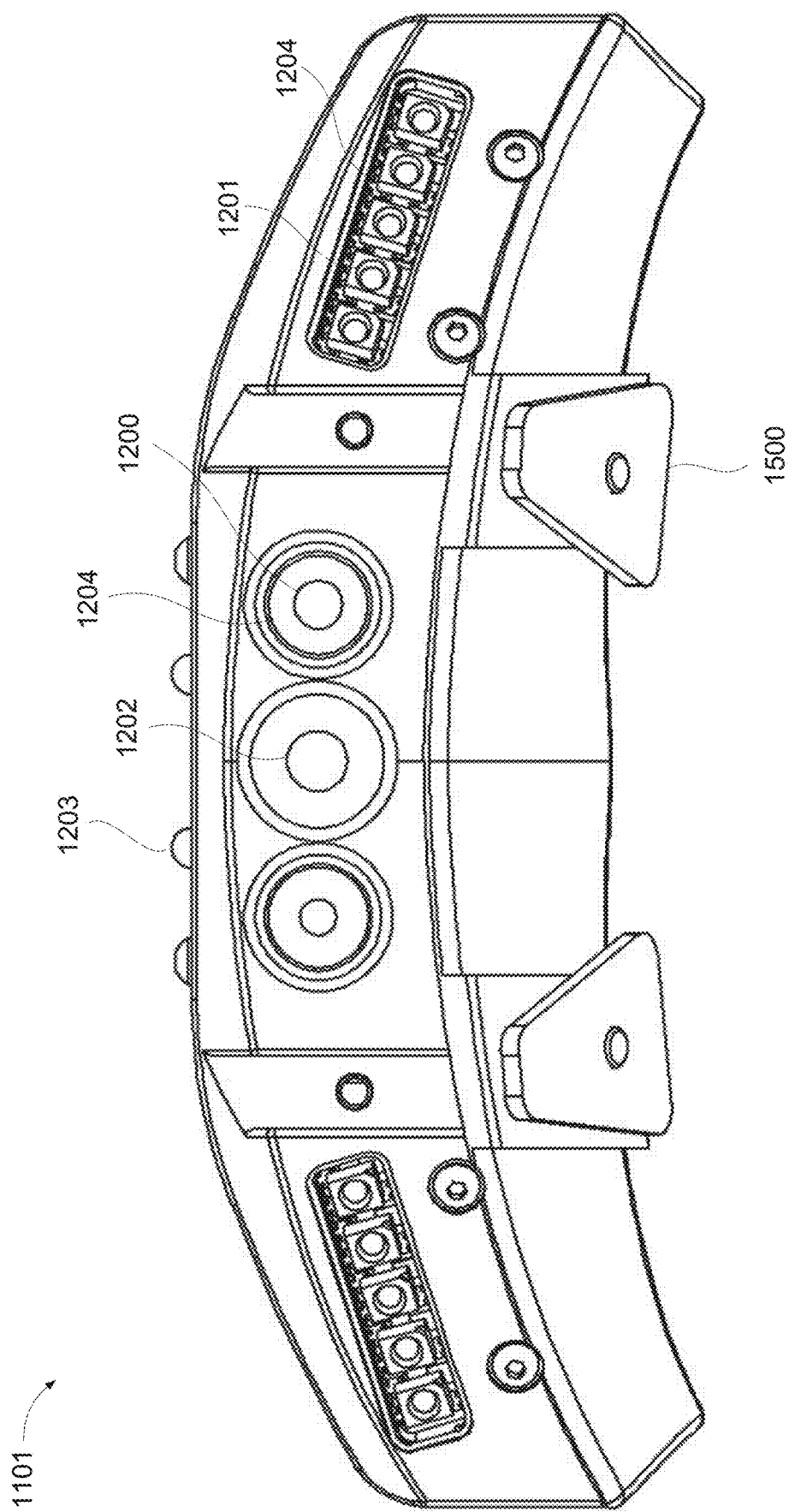
FIG. 10 shows a front and bottom perspective view of an animal-wearable first person view (AW-FPV) device.
Figure 11:
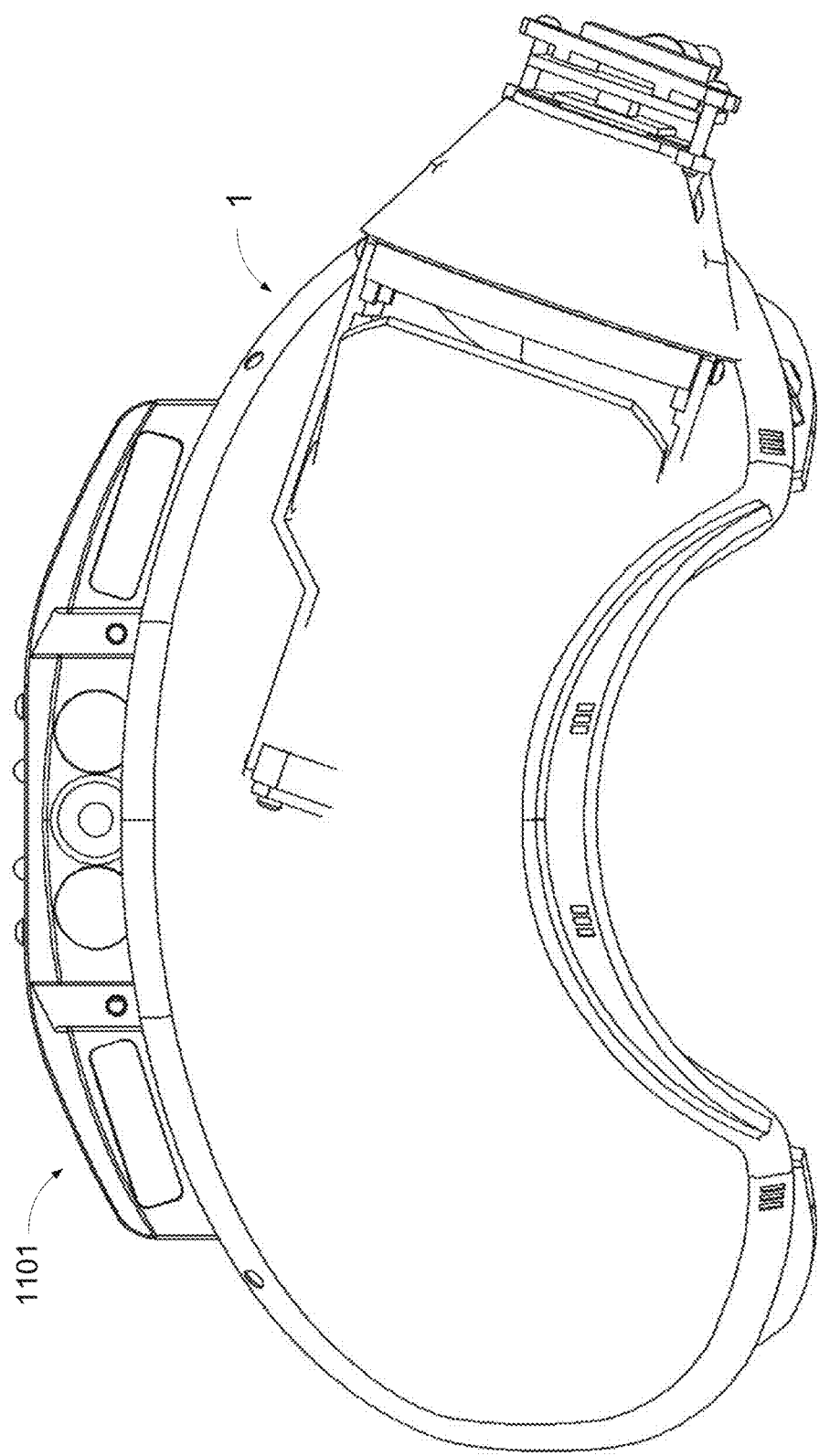
FIG. 11 shows how the AW-FPV device can mount to an AW-HMD.

FIG. 10 shows a front and bottom perspective view of an embodiment of the AW-FPV device. FIG. 11 shows how such an embodiment can mount to an AW-HMD designed for a canine, such as described above. In this embodiment, the AW-FPV device 1101 is a sensor module that includes two camera modules 1200 (such as the Leopard Imaging LI-OV9712-USB-M8), illuminating LEDs 1201 (such as the Osram SFH 4710), a microphone 1202 and status LEDs 1203 for ease of use.

The FOV provided by the camera or cameras 1200, in some embodiments, may be fixed and in others may be variable dynamically (i.e., during operation). Additionally, in this context the FOV may relate to vertical or horizontal orientations. Moreover, in some embodiments, the cameras 1200 may also have mechanical image stabilization, such that the image captured by the camera is stable in both static and dynamic scenarios. In some embodiments, the cameras 1200 may also have dynamic pan and zoom functionality, controlled by the associated processing capability of the AW-FPV system. In other instances, pan and zoom functionality may be controlled by a human user through remote user interfaces presented on a remote processing device, via a wireless (or wired) network connection (similarly to as described above in connection with the AW-HMD embodiments). In other embodiments, the ability to manipulate pan and zoom, as well as camera orientation and resulting field of view, may be adjusted manually at the AW-FPV device 1101 device itself.

In some embodiments, the illuminating LEDs 1201 may be aligned to the field of view of the cameras 1200. In the case that a remote user interface is being used to remotely view the captured image and environment of the AW-FPV device 1101 through a network connection, the observer may choose to ensure that the illuminating lights match the FOV of the camera, such that the best possible image is presented to the remote user interface. In other instances, it may be desirable to set a narrow and bright path, or a more widely distributed illumination stream; more confined than the camera 1200 FOV, or well beyond the FOV of the camera 1200. In these instances, the user is able to make this dynamic adjustment to the AW-FPV device 1101 through a remote user interface, via a networked connection. In some embodiments, however, as described herein, a user of the AW-FPV system may wish to manipulate the illuminating perspective of the LEDs 1201, manually. In such a case, it may be possible for manual adjustment directly on the AW-FPV device 1101 itself, to adjust the LEDs 1201 to the desired illumination angle.

Some embodiments of the AW-FPV device 1101 may contain indicators 1203 both for functional and aesthetic purposes. Indicators 1203 are assumed to be LEDs herein to facilitate description, but can be any other type of indicator. The LED indicators 1203 can provide indication of the system's successful operation. Alternatively or additionally, the LED indicators 1203, may simply provide a useful yet aesthetic complement to the overall design of the AW-FPV device 1101, controlled either by a remote user interface 103 through a networked connection 104 and/or through manual manipulation at the AW-FPV device 1101. The use of functional and/or aesthetic LEDs 1203 are not mutually exclusive, nor is the number of LEDs 1203 limited to the number shown.

The optional microphone 1202 enables the AW-FPV device 1101 to discern cardioid audio patterns, omnidirectional audio, and/or both. Moreover, based on what is desirable, some embodiments may include more than one microphone 1202, such that appropriate audio coverage is captured.

Some embodiments of the AW-FPV device 1101 may include protective coverings 1204 of the elements described herein. Protective coverings 1204 allow for normal operation of the equipment they are meant to protect, which in this embodiment may be transparent covers to LEDs 1201 and cameras 1200. However, in some embodiments it may be desirable for the protective coverings 1204 to modify the light entering the cameras 1200 and/or emitted by the illuminating LEDs 1201, such that the image is modified in a desirable way to facilitate observation through a remote user interface.

The configuration illustrated in FIG. 10 can be lightweight and compact, such that it fits flush against a portion of an animal based device, object, or mount, such as the AW-HMD described above and in FIGS. 1 through 9. Such a configuration is shown in FIG. 11. Other embodiments of the AW-FPV device 1101 may only include one camera and no other imaging or sensing components, thus, reducing the form factor of the overall AW-FPV device 1101. In other embodiments, the AW-FPV device 1101 may include additional cameras, more or fewer LEDs, more or fewer microphones, and/or may be of a smaller or larger size.

Some embodiments of the AW-FPV device 1101 may include outwardly projecting light sources, such that a directed beam of light that can be pointed in a direction at the discretion of a user through a remote user interface through a networked connection. Moreover, through detection by the camera(s) 1201 and use of associated processing power in the AW-FPV device 1101 and/or the remote device, the directed light source can be automatically aimed toward objects of interest in the environment 102 (e.g., an object that has just entered the FOV), based, for example, on user-specified settings in the AW-FPV device 1101.

Figure 12:
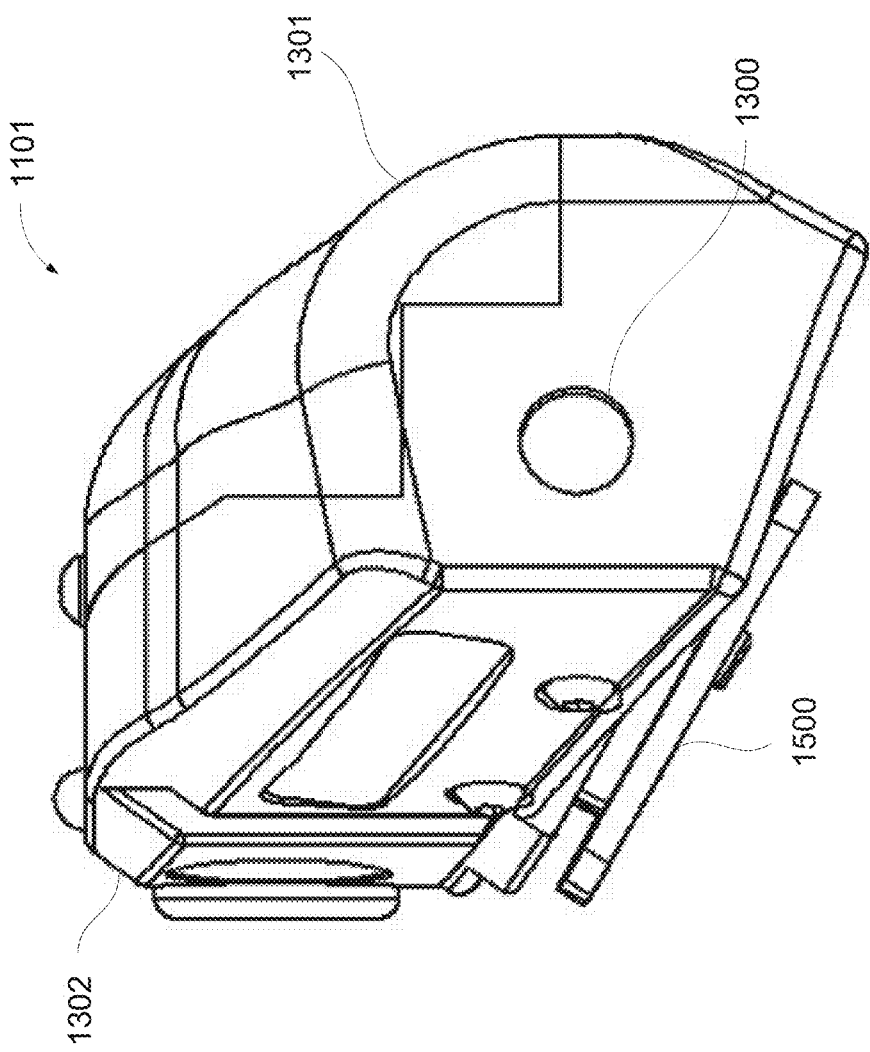
FIG. 12 shows a side and partial front perspective view of the AW-FPV device.

FIG. 12 illustrates a side and partial front view of the AW-FPV device 1101 in accordance with the principles introduced here. In this embodiment, the AW-FPV device 1101 includes speakers 1300 on the side AW-FPV device 1101. For some embodiments it may be desirable to provide auditory cues to the animal wearing the AW-FPV device 1101. As such, directional placement or orientation of the speakers may be optimized to take advantage of typical mammalian auditory characteristics and morphology, including the ability for the AW-FPV device 1101 to produce binaural sounds and/or generate sounds at a frequency discernable only to the animal. In some embodiments, however, it may be desirable to use a speaker 1300 to communicate broadly with the ambient environment, in which case the location of the speaker 1300 may not be on the side or sides of the AW-FPV device 1101, rather, it may be located, on the top of the AW-FPV device 1101, for example.

The AW-FPV device 1101, via a remote user interface for viewing information provided by the AW-FPV device 1101 via a networked connection, may also allow for dynamic manipulation of the speakers 1300, based on real-time scenarios. For example, it may be desirable for a remote user to toggle between frequencies delivered by the speaker 1300. Moreover, because of the AW-FPV device 1101 is able to detect environmental conditions through sensors and associative processing power, the AW-FPV device 1101 may also dynamically modulate the frequency and/or volume level delivered through the speakers 1300 based on real-time conditions.

In the illustrated embodiment, the housing for the AW-FPV device is constructed in two primary pieces: a primary housing 1302, and a back housing 1301. In this embodiment the primary housing 1302 and back housing 1301 are connected and mounted to the top portion of an animal worn goggle, such as that produced by Rex Specs, using two fasteners, each comprising a screw and a mounting plate. In other embodiments, it may be desirable for the housing of the AW-FPV device 1101 to be constructed in a uni-body fashion or in more than two primary components.

Figure 13:
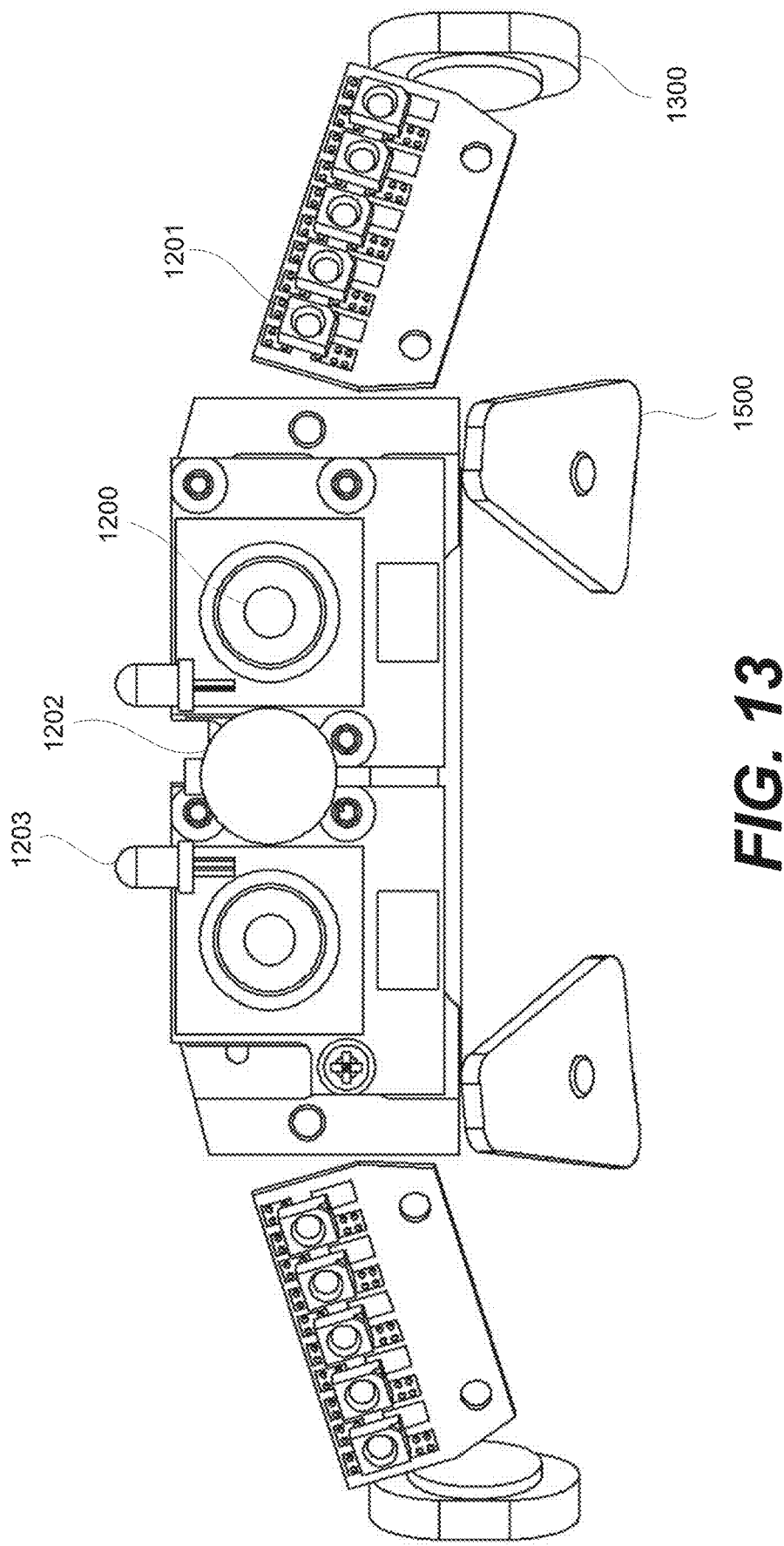
FIG. 13 shows an example of the internal components of the AW-FPV device.

FIG. 13 shows an example of the internal components of the AW-FPV device 1101, i.e., without the housing, including cameras 1200, illuminating LEDs 1201, microphone 1202, LED indicators 1203 and speakers 1300. It should be noted that this mechanical configuration of parts and all other embodiments and examples presented herein are only illustrative, not limiting. As described, the AW-FPV device 1101, may include fewer or more of each component shown in this drawing, and therefore, the actual configuration and location of each component piece may be adjusted to fit the requirements of the AW-FPV system, generally. For instance, the illustrated embodiment of the AW-FPV device 1101 may be suitable for use with the large size of goggles commercially available from Rex Specs. In other embodiments, it may be desirable to reduce the size of the AW-FPV device.

The AW-FPV device may also include additional components, which are not shown, such as a power supply (e.g., battery), microprocessor, memory, wireless transceiver and antenna. In some embodiments, those additional components may be located within or integral to the housing. For example, the antenna can be of a form that wraps around at least part of the housing of the AW-FPV device. The processor, memory and wireless transmitter can be part of a system-on-a-chip (SoC) mounted on a custom-built printed circuit board (PCB). The battery can be a custom rechargeable battery pack. In other embodiments, at least some of those additional components may be external to the housing; for example, some of all of those components may be mounted on or in a vest 421 worn by the animal 422, as shown in FIG. 4D, discussed above. These components may be contained within one or more physical modules 423 that are attached to the vest and connected to the head-mounted portion of the AW-FPV device by one or more cables for providing power to the head-mounted portion and communicating data between the head-mounted portion and the components in the module(s) 423. In other embodiments, the one or more modules may communicate with and/or provide power to the head-mounted portion wirelessly.

Figure 14:
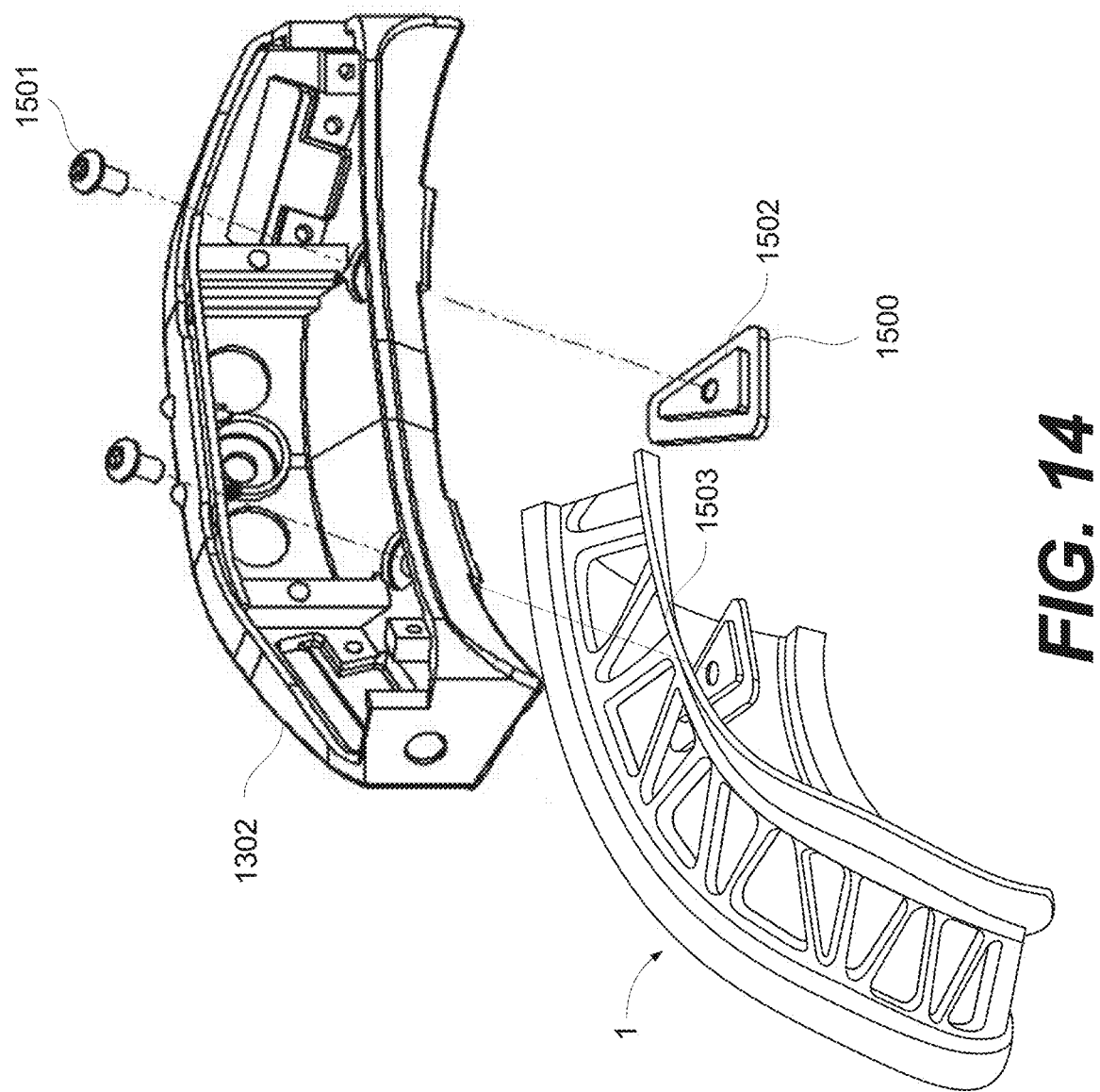
FIG. 14 shows an example of the mounting and locking mechanisms of the AW-FPV device.

FIG. 14 illustrates an embodiment of the mounting and locking mechanisms of the AW-FPV device 1101, that secures the AW-FPV device 1101 to an animal worn device head fitting, such as that of the AW-HMD described above, aligning it to the point of view of the animal. In some embodiments it may be desirable to have dedicated mounting. In the embodiment shown in FIG. 14, each mounting and locking plate 1500 attaches to two separate points on the AW-FPV device 1101 and existing animal worn device. The design of the mounting and locking plates 1500 shown in FIG. 14 is designed to fit the particular ribbing 1503 provided in the upper area of the goggles, such as Rex Specs goggles in the illustrated embodiment shown from the top view of a cross-section illustration. The AW-FPV device 1101 may be attached to the animal worn device by putting the plates 1500 underneath the top surface ribbing of the animal worn device, with the flat, triangular protrusions 1502 on plates 1500 making contact with the bottom surface of the housing of the AW-FPV device 1101, and the AW-FPV device 1101, which are secured in place by screws 1501 directly from the inside of the AW-FPV device 1101 through existing animal worn device into screw holes in the mounting and locking plates 1500.

Additional embodiments may also include snap and lock mechanisms with a cantilever, whereby it may be possible to manually retract the cantilever hook, place the AW-FPV device 1101 onto the surface of which it is to be mounted, in this case, Rex Specs goggles, and upon releasing the cantilever hooks, the hooks would naturally lock the AW-FPV device 1101 into position by locking into place by securing itself to the ribbing 1503 on the top of the Rex Specs goggles. Moreover, additional methods for securing the AW-FPV device 1101 may also be desirable such that the AW-FPV device 1101, can easily secure to an existing device, or object by use of clips. In such an embodiment, pressure mounted clips may be mounted to the AW-FPV device 1101, securing in a similar fashion instead of screws 1501 in FIG. 14, although the clips may protrude from the AW-FPV device 1101 and allow for easy attaching and detaching from the top ribbing 1503 of the Rex Specs goggle.

In the illustrated embodiments, the orientation of the front housing 1302, back housing 1301, mounting mechanisms, and overall design have been made with respect to the morphological characteristics of mammals, such that the principles do not adhere to traditional orthogonal human-worn devices. Moreover, the non-planar facial structure of most mammalian species indicates that any animal worn device, specifically relating to devices worn on the head, will tend to have a horizontal rotation. Thus, it may be desirable for some applications of the AW-FPV device 1101 to counter this horizontal rotation tendency of the mounting surface, by mounting the AW-FPV device 1101 in such a way that it can overcome the rotation, giving it a downward focused appearance. In other embodiments, in may be desirable that, instead of orienting the AW-FPV device 1101 in its entirety in a downward manner, the individual components making up the AW-FPV device 1101, such as the cameras 1200 and the like, be mounted within the AW-FPV device 1101 with the appropriate downward angle to accommodate for the specific head orientation of the animal such that the observer through a remote user interface 103 may mirror the viewing angle of the animal wearing the AW-FPV device 1101.

Figure 15:
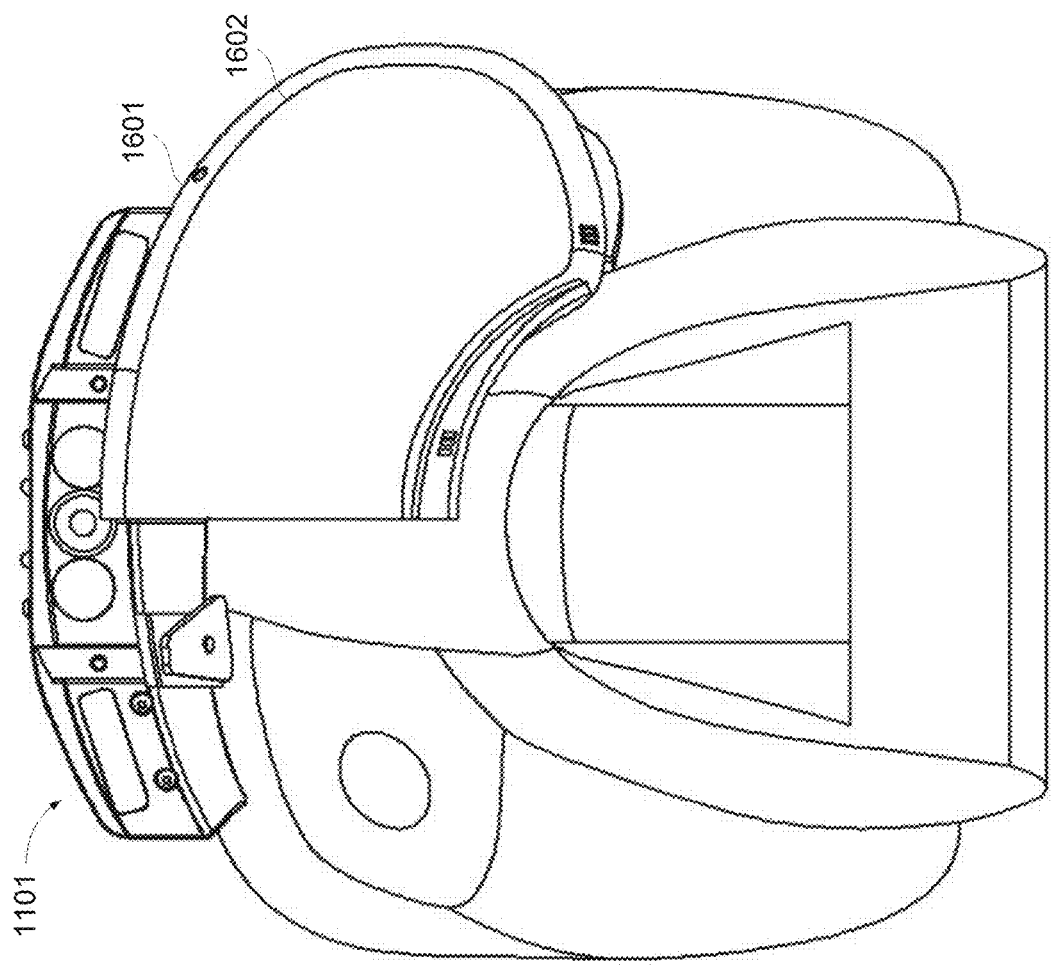
FIG. 15 shows an example of mounting of the AW-FPV device to canine-adapted goggles.

FIG. 15 illustrates an example of mounting of the AW-FPV device 1101 to canine-adapted goggles 1600, such as those made by Rex Specs (only half of the goggles 1600 is shown, to enable better visualization of the AW-FPV device 1101). In this embodiment, the elements illustrated in FIGS. 11 and 12 are evident and assumed. Other embodiments of the AW-FPV device 1101 may also be desired such that a lower profile is made possible and/or components of the system are given further protection by being mounted inside of the body of the goggle itself. More specifically, it may be desirable for the cameras 102 to be flush with the top portion of the goggles. As such, some embodiments may have the cameras 102 laid flat, pointing vertically, and may employ fold mirrors to provide the camera a view of the outside world. In other embodiments, the cameras 102 may be mounted inside the goggle, providing additional protection from the elements. It may also be desirable that with an embodiment aimed at decreasing the size of the form factor of the AW-FPV device 1101, and thus more seamlessly integrating into the AW-FPV device 1101, the illuminating LEDs 102 may also be decreased in height and/or may have different mounting locations, where, in the case of using Rex Specs goggles, for example, the Illuminating LEDs 102 would be designed to fit over the molding 1601 of the goggles, covering the molding 1601 in which the lens 1602 of the Rex Specs goggles is secured.

Figure 16:
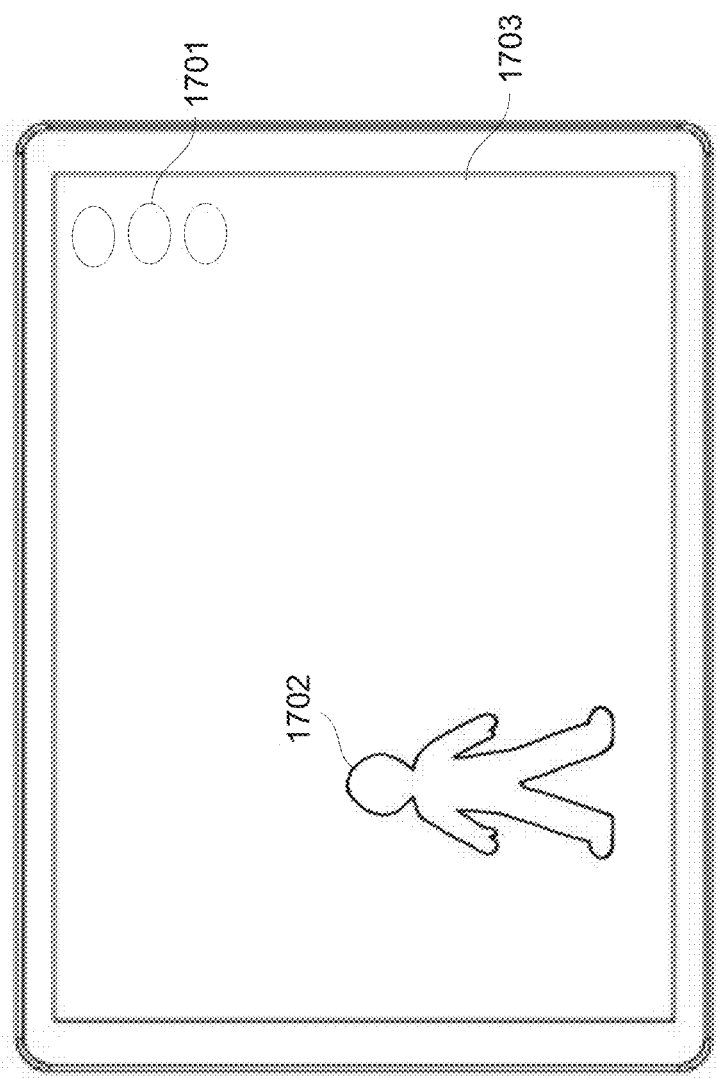
FIG. 16 shows an example of a user interface that may be used to view images captured by the AW-FPV device and/or to control functions of the AW-FPV device.

FIG. 16 depicts an example of a remote user interface 1703 for use by a human observer via a network connection, with respect to the use of the AW-FPV device 1101. The animal wearer of AW-FPV device 1101 may encounter person 1702 and/or other objects of interest in a typical rural, urban, and/or suburban environment or the like, images are of which captured by the AW-FPV device 1101 and displayed on the remote user interface 1703. A human user of the remote user interface 1703 may choose to engage with the captured scene in myriad ways that are desirable to them. In one embodiment, the observer may choose to record a sequence of events being observed by the AW-FPV device 1101 to the cloud, locally to the AW-FPV device 1101 through an internal or removable storage device, or the remote user interface 1703, or the like.

In certain embodiments, the remote observer of the environment being captured by the AW-FPV device 1101 may choose to manually change, control or configure cameras 1200 on the AW-FPV device 1101, and/or change, control or configure the radiance and intensity of the illuminating LEDs 1201, by using a control 1701 (for example, a button, slider, or toggle switch) displayed on the remote user interface 1703. Further, it may be desirable for the observer to modify the picture being displayed on the remote user interface such that the picture more closely matches the acuity and perception of an animal or species wearing the AW-FPV device 1101.

The remote device that generates the remote user interface may be a secondary HMD device, worn by a human, such as an AR, MR and/or virtual reality (VR) headset, such that the wearer of the secondary HMD device can be virtually immersed in the environment of the animal. The remote user interface may be interactive, such that the wearer of the secondary HMD device, through gesture, voice commands, or the like, can affect or adjust operation of the AW-FPV and/or the AW-HMD (e.g., to guide the animal, adjust device settings, etc.)

The AW-FPV device 1101 may include one or more processors to perform and/or control the various functions of the AW-FPV mentioned above, as well as one or more wireless transceivers, memory and other electronic components. To that extent, the block diagram of FIG. 9, discussed above in relation to the AW-HMD, may also be representative of the architecture and major components of the AW-FPV device 1, according to at least one embodiment. In embodiments that include both an AW-HMD and an AW-FPV device, at least some components may be shared by the AW-HMD and an AW-FPV device.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

Examples of Certain Embodiments

Certain embodiments of the technology introduced herein are summarized in the following numbered examples:

1. A head-mountable display device comprising: a head fitting designed to fit the head of an animal; and an output subsystem coupled to or integral with the head fitting and configured to output a signal to the animal.

2. A head-mountable display device as recited in example 1, wherein the output subsystem comprises an optical module configured to project an image into an eye of the animal.

3. A head-mountable display device as recited in any of example 1 or example 2, wherein the optical module comprises a display element that is at least partially transparent, on which to overlay augmented reality images and/or mixed reality images on the animal's view of the real world.

4. A head-mountable display device as recited in any of examples 1 through 3, wherein the optical module is configured to display images using shapes and colors optimized for visual perception capabilities of a particular animal species.

5. A head-mountable display device as recited in any of examples 1 through 4, wherein the optical module is configurable to generate images conforming to a plurality of different visual acuity and visual perception requirements for a plurality of different animal species.

6. A head-mountable display device as recited in any of examples 1 through 5, wherein the output subsystem comprises an audio output device.

7. A head-mountable display device as recited in any of examples 1 through 6, wherein the output subsystem comprises a tactile output device.

8. A head-mountable display device as recited in any of examples 1 through 7, wherein the output subsystem comprises an olfactory output device.

9. A head-mountable display device as recited in any of examples 1 through 8, wherein the output subsystem comprises at least two from the list consisting of: an optical module configured to project an image into an eye of the animal an audio output device; a tactile output device; or an olfactory output device.

10. A head-mountable display device as recited in any of examples 1 through 9, further comprising a camera arranged to perform eye tracking of an eye of the animal.

11. A head-mountable display device as recited in any of examples 1 through 10, further comprising a wireless receiver to receive a wireless communication signal via a wireless communication link in response to a user input from a remote user, the wireless communication signals for controlling a function of the head-mountable display device.

12. A head-mountable display device as recited in any of examples 1 through 11, wherein the output system includes an output device controllable by the remote user via the wireless communication signal, to provide the signal to the animal.

13. A head-mountable display device as recited in any of examples 1 through 12, wherein the signal to the animal is a visual signal.

14. A head-mountable display device as recited in any of examples 1 through 13, wherein the signal to the animal is an auditory signal.

15. A head-mountable display device as recited in any of examples 1 through 14, wherein the signal to the animal is a tactile signal.

16. A head-mountable display device as recited in any of examples 1 through 15, wherein the signal to the animal is an olfactory signal.

17. A head-mountable display device as recited in any of examples 1 through 16, further comprising: a camera arranged to acquire viewpoint images corresponding to a visual perspective of the animal; and a wireless transmitter configured to transmit image data representing the viewpoint images to a remote device.

18. A head-mountable display device comprising: a head fitting designed to fit the head of an animal; an optical module configured to project an image into an eye of the animal, wherein the optical module includes a display element that is at least partially transparent, on which to overlay augmented reality images and/or mixed reality images on the animal's view of the real world; and at least two from the list consisting of: an audio output device, a tactile output device and an olfactory output device.

19. A head-mountable display device as recited in example 18, further comprising a wireless receiver to receive a wireless communication signal via a wireless communication link in response to a user input from a remote user, the wireless communication signals for controlling a function of the head-mountable display device.

20. A head-mountable display device as recited in example 18 or example 19, wherein the function is one of a visual signal to the animal, an auditory signal to the animal, a tactile signal to the animal or an olfactory signal to the animal.

21. A head-mountable display device as recited in any of examples 18 through 20, further comprising: a camera arranged to acquire viewpoint images corresponding to a visual perspective of the animal; and a wireless transmitter configured to transmit image data representing the viewpoint images to a remote device.

22. A method of operation of a head-mountable display device designed to be worn by an animal, the method comprising: projecting a plurality of images into an eye of the animal from a display element mounted to the head of the animal; receiving, via a wireless communication link, a control signal from a remote user; and generating an output signal to the animal based on the control signal.

23. A method as recited in example 22, wherein the output signal is included in the plurality of images.

24. A method as recited in example 22 or example 23, wherein the output signal is a non-visual signal.

25. A method as recited in any of examples 22 through 24, wherein the output signal is an audible signal.

26. A method as recited in any of examples 22 through 25, wherein the output signal is a tactile signal.

27. A method as recited in any of examples 22 through 26, wherein the output signal is an olfactory signal.

28. A method as recited in any of examples 22 through 27, further comprising: acquiring viewpoint images corresponding to a visual perspective of the animal; and transmitting image data representing the viewpoint images from the device to a remote device.

29. A sensor module comprising: a housing; at least a portion of a fastener, the fastener configured to removably attach the housing to a head fitting designed to fit the head of an animal; and a first camera at least partially contained within the housing and positioned to acquire image data of a real world environment of the animal when in operation while the sensor module is attached to the head fitting and the head fitting is worn by the animal.

30. A sensor module as recited in example 29, wherein the head fitting comprises goggles.

31. A sensor module as recited in example 29 or 30, further comprising a second camera at least partially contained within the housing and positioned to acquire image data of the real world environment of the animal when in operation while the sensor module is attached to the head fitting and the head fitting is worn by the animal.

32. A sensor module as recited in any of examples 29 through 31, further comprising a microphone at least partially contained within the housing and positioned to acquire audio data of the real world environment of the animal when in operation while the sensor module is attached to the head fitting and the head fitting is worn by the animal 33. A sensor module as recited in any of examples 29 through 32, wherein the head fitting comprises goggles, the sensor module further comprising a plurality of light emission elements at least partially contained within the housing and positioned to illuminate a field of view of the animal when in operation while the sensor module is attached to the goggles and the goggles is worn by the animal.

34. A sensor module as recited in any of examples 29 through 33, further comprising an audio speaker.

35. A sensor module as recited in any of examples 29 through 34, further comprising a second camera at least partially contained within the housing and positioned to acquire image data of the real world environment of the animal when in operation while the sensor module is attached to the goggles and the goggles is worn by the animal; a plurality of light emission elements at least partially contained within the housing and positioned to illuminate a field of view of the animal when in operation while the sensor module is attached to the goggles and the goggles is worn by the animal; a microphone at least partially contained within the housing and positioned to acquire audio data of the real world environment of the animal when in operation while the sensor module is attached to the goggles and the goggles is worn by the animal; and an audio speaker.

36. A head-mountable first person viewing system comprising: a head fitting designed to fit the head of an animal; a first camera coupled to the head fitting and positioned to acquire image data of a real world environment of the animal when the head-mountable first person viewing system is worn by the animal; and a wireless transmitter configured to transmit the image data in real-time, for delivery to a remote device configured to display images of the real world environment of the animal, based on the image data.

37. A head-mountable first person viewing system as recited in example 36, wherein the head fitting comprises goggles.

38. A head-mountable first person viewing system as recited in example 36 or 37, wherein the camera is at least partially contained within a sensor module that is removably attached to the goggles.

39. A head-mountable first person viewing system as recited in any of examples 36 through 38 wherein the sensor module is removably attached to a top surface of the goggles.

40. A head-mountable first person viewing system as recited in any of examples 36 through 39, wherein the top surface of the goggles comprises a webbing, the webbing including spaced apart segments of solid material, and wherein the sensor module is removably attached to the goggles by fasteners, at least portions of which pass through air gaps between the segments of solid material in the webbing.

41. A head-mountable first person viewing system as recited in any of examples 36 through 40, further comprising a second camera positioned to acquire image data of the real world environment of the animal when in operation while the head fitting is worn by the animal; and a plurality of light emission elements positioned to illuminate a field of view of the animal when in operation while the head fitting is worn by the animal.

42. A head-mountable first person viewing system as recited in any of examples 36 through 41, further comprising a housing coupled to the head fitting, the housing at least partially containing the first and second cameras and the plurality of light emission elements.

43. A head-mountable first person viewing system as recited in any of examples 36 through 42, further comprising a microphone at least partially contained within the housing and positioned to acquire audio data of the real world environment of the animal when in operation while the head fitting is worn by the animal.

44. A head-mountable first person viewing system as recited in any of examples 36 through 43, further comprising an audio speaker.

45. A head-mountable input/output (I/O) system comprising: a head fitting designed to fit the head of an animal; an optical output subsystem coupled to or integral with the head fitting and configured to output images to the animal; a plurality of cameras, each at least partially contained within the housing and positioned to acquire image data of a real world environment of the animal when in operation while the head-mountable I/O system is worn by the animal; and a wireless transmitter configured to transmit the image data in real-time, for delivery to a remote device configured to display images of the real world environment of the animal, based on the image data.

46. A head-mountable I/O system as recited in example 45, wherein the head fitting comprises goggles.

47. A head-mountable I/O system as recited in example 45 or 46, wherein the camera is at least partially contained within a sensor module that is removably attached to the goggles.

48. A head-mountable I/O system as recited in any of examples 45 through 47, wherein the sensor module is removably attached to a top surface of the goggles.

49. A head-mountable I/O system as recited in any of examples 45 through 48, wherein the top surface of the goggles comprises a webbing, the webbing including spaced apart segments of solid material, and wherein the sensor module is removably attached to the goggles by fasteners, at least portions of which pass through air gaps between the segments of solid material in the webbing.

50. A head-mountable I/O system as recited in any of examples 45 through 49, further comprising a microphone at least partially contained within the housing and positioned to acquire audio data of the real world environment of the animal when in operation while the head fitting is worn by the animal; and a plurality of light emission elements at least partially contained within the housing and positioned to illuminate a field of view of the animal when in operation while the head fitting is worn by the animal.

51. A head-mountable I/O system as recited in any of examples 45 through 50.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A sensor module comprising:
    a housing of the sensor module;
    at least a portion of a fastener,
    wherein the housing and the fastener are designed to enable the sensor module to be removably attached to a particular design of goggles designed to fit the morphological head structure of a specific animal or a specific species of animal; and
    a first camera at least partially contained within the housing and positioned to acquire image data of a real world environment of the animal from a perspective of an animal when in operation while the sensor module is attached to the goggles and the goggles are worn by the animal.

2. A sensor module as recited in claim 1, further comprising:
    a second camera at least partially contained within the housing and positioned to acquire image data of the real world environment of the animal when in operation while the sensor module is attached to the goggles and the goggles are worn by the animal.

3. A sensor module as recited in claim 1, further comprising:
    a microphone at least partially contained within the housing and positioned to acquire audio data of the real world environment of the animal when in operation while the sensor module is attached to the goggles and the goggles are worn by the animal.

4. A sensor module as recited in claim 1, further comprising:
    a plurality of light emission elements at least partially contained within the housing and positioned to illuminate a field of view of the animal when in operation while the sensor module is attached to the goggles and the goggles is worn by the animal.

5. A sensor module as recited in claim 1, further comprising an audio speaker.

6. A sensor module as recited in claim 1, further comprising:
    a second camera at least partially contained within the housing and positioned to acquire image data of the real world environment of the animal when in operation while the sensor module is attached to the goggles and the goggles is worn by the animal;
    a plurality of light emission elements at least partially contained within the housing and positioned to illuminate a field of view of the animal when in operation while the sensor module is attached to the goggles and the goggles is worn by the animal;
    a microphone at least partially contained within the housing and positioned to acquire audio data of the real world environment of the animal when in operation while the sensor module is attached to the goggles and the goggles is worn by the animal; and
    an audio speaker.

7. A sensor module as recited in claim 1, wherein the housing and the fastener enable the sensor module to be removably attached to a webbed portion of the goggles, the webbed portion of the goggles including segments of solid material with gaps therebetween, such that the sensor module can be removably attachable to the goggles by fasteners, at least portions of which pass through one or more of the gaps between the segments in the webbed portion.

8. A head-mountable first person viewing system comprising:
    a head fitting designed to fit the head of an animal;
    a first camera coupled to the head fitting and positioned to acquire image data of a real world environment of the animal from the perspective of the animal when the head-mountable first person viewing system is worn by the animal; and
    a plurality of input/output components that collectively enable a remote human user to interact with the animal in real time while the head-mountable first person viewing system is worn by the animal, the plurality of input/output components including a wireless transceiver to transmit the image data acquired by the first camera over a wireless link in real-time, for delivery to a remote device configured to display real-time images of the real world environment of the animal to the human user based on the image data, the wireless transceiver further to receive over the wireless link signals indicative of a signal from the human user to the animal, the plurality of input/output components further including an output device to generate in real time an output to the animal indicative of the signal from the human user to the animal.

9. A head-mountable first person viewing system as recited in claim 8, wherein the head fitting comprises goggles.

10. A head-mountable first person viewing system as recited in claim 9, wherein the first camera is at least partially contained within a sensor module that is removably attached to the goggles.

11. A head-mountable first person viewing system as recited in claim 10, wherein the sensor module is removably attached to a top surface of the goggles.

12. A head-mountable first person viewing system as recited in claim 11, wherein the top surface of the goggles comprises a webbing, the webbing including spaced apart segments of solid material, and wherein the sensor module is removably attached to the goggles by fasteners, at least portions of which pass through air gaps between the segments of solid material in the webbing.

13. A head-mountable first person viewing system as recited in claim 8, further comprising:
   a second camera positioned to acquire image data of the real world environment of the animal when in operation while the head fitting is worn by the animal; and
   a plurality of light emission elements positioned to illuminate a field of view of the animal when in operation while the head fitting is worn by the animal.

14. A head-mountable first person viewing system as recited in claim 13, further comprising a housing coupled to the head fitting, the housing at least partially containing the first and second cameras and the plurality of light emission elements.

15. A head-mountable first person viewing system as recited in claim 14, further comprising:
   a microphone at least partially contained within the housing and positioned to acquire audio data of the real world environment of the animal when in operation while the head fitting is worn by the animal.

16. A head-mountable first person viewing system as recited in claim 15, further comprising an audio speaker.

17. A head-mountable input/output (I/O) system comprising:
   a head fitting designed to fit the head of an animal;
   an optical output subsystem coupled to or integral with the head fitting and configured to output images to the animal;
   a plurality of cameras, each at least partially contained within the housing and positioned to acquire image data of a real world environment of the animal when in operation while the head-mountable I/O system is worn by the animal; and
   plurality of input/output components that collectively enable a remote human user to interact with the animal in real time while the head-mountable I/O system is worn by the animal, the plurality of input/output components including a wireless transceiver to transmit the image data acquired by one or more of the cameras over a wireless link in real-time, for delivery to a remote device configured to display real-time images of the real world environment of the animal to the human user based on the image data, the wireless transceiver further to receive over the wireless link signals indicative of a signal from the human user to the animal, the plurality of input/output components further including an output device to generate in real time an output to the animal indicative of the signal from the human user to the animal.

18. A head-mountable I/O system as recited in claim 17, wherein the head fitting comprises goggles.

19. A head-mountable I/O system as recited in claim 18, wherein the plurality of cameras are at least partially contained within a sensor module that is removably attached to the goggles.

20. A head-mountable I/O system as recited in claim 19, wherein the sensor module is removably attachable to a surface of the goggles.

21. A head-mountable I/O system as recited in claim 20, wherein the surface of the goggles comprises a webbing, the webbing including spaced apart segments of solid material, and wherein the sensor module is removably attached to the goggles by fasteners, at least portions of which pass through air gaps between the segments of solid material in the webbing.

22. A head-mountable I/O system as recited in claim 17, further comprising:
   a microphone at least partially contained within the housing and positioned to acquire audio data of the real world environment of the animal when in operation while the head fitting is worn by the animal; and
   a plurality of light emission elements at least partially contained within the housing and positioned to illuminate a field of view of the animal when in operation while the head fitting is worn by the animal.

23. A head-mountable I/O system as recited in claim 22, further comprising an audio speaker.

* * * * *